(12) United States Patent
Akiyama

(10) Patent No.: US 7,052,139 B2
(45) Date of Patent: May 30, 2006

(54) ILLUMINATION UNIT AND PROJECTOR INCLUDING THE SAME

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/913,480

(22) Filed: Aug. 9, 2004

(65) Prior Publication Data

US 2005/0068507 A1    Mar. 31, 2005

(30) Foreign Application Priority Data

Aug. 22, 2003   (JP)   ............... 2003-299076

(51) Int. Cl.
  G03B 21/14  (2006.01)
  G03B 21/28  (2006.01)
  G03B 21/20  (2006.01)
  G02B 3/00   (2006.01)
  F21S 6/00   (2006.01)

(52) U.S. Cl. .................. 353/38; 353/97; 353/98; 353/102; 362/257; 359/642

(58) Field of Classification Search .............. 353/20, 353/30, 31, 98, 102, 38, 97; 362/257; 359/642
See application file for complete search history.

(56) References Cited

U.S. PATENT DOCUMENTS 6,729,730 B1 * 5/2004 Ito ............... 353/20

FOREIGN PATENT DOCUMENTS

| JP | 07-181392 A | 7/1995 |
|---|---|---|
| JP | 11-160791 A | 6/1999 |
| JP | 2000-121997 A | 4/2000 |
| JP | 2000-347293 | 12/2000 |
| JP | 2001-066697 A | 3/2001 |
| JP | 2002-055208 | 2/2002 |
| JP | 2002-055208 A | 2/2002 |
| JP | 2002-090505 A | 3/2002 |
| JP | 2002-090884 A | 3/2002 |
| JP | 2002-221756 A | 8/2002 |
| JP | 2003-023585 A | 1/2003 |
| JP | 2003-075915 A | 3/2003 |
| JP | 2003-090981 A | 3/2003 |
| JP | 2003-149730 A | 5/2003 |

* cited by examiner

Primary Examiner—Melissa Jan Koval
(74) Attorney, Agent, or Firm—Oliff & Berridge, PLC

(57) ABSTRACT

An illumination unit of the present invention includes: an ellipsoidal reflector having a first focus and a second focus; an arc tube; a collimating lens; a first lens array 120 having a plurality of small lenses 122 for splitting the illumination luminous flux from the collimating lens into a plurality of partial luminous fluxes; a second lens array having a plurality of small lenses corresponding to the plurality of the small lenses 122 of the first lens array 120; and a superimposing lens for superimposing respective partial luminous fluxes from the second lens array at the illuminated area, characterized in that the light incident surface of the first lens array 120 is situated at the position which is closer to the ellipsoidal reflector than the second focus, and which is such that the light quantity of the illumination luminous flux from the collimating lens is distributed throughout over the light incident surface.

This enables the achievement of the simplification of manufacturing processing and the reduction of the manufacturing cost of the first lens array without reducing the inplane light intensity distribution characteristics on the image formation area of the electrooptic modulation unit which is the illuminated area.

32 Claims, 15 Drawing Sheets

ILLUMINATION UNIT AND PROJECTOR INCLUDING THE SAME

BACKGROUND OF THE INVENTION

1. Field of Invention

Exemplary aspects of the present invention relate to an illumination unit, and a projector including the same.

2. Description of Related Art

Related art projectors include an illumination unit to emit an illumination light, an electrooptic modulation unit to modulate the illumination light from the illumination unit in response to an image signal, and a projection optical system to project the light modulated by the electrooptic modulation unit as a projection image on a projection surface, such as a screen.

In such a related art projector, the luminance distribution of the projected and displayed image may be roughly uniform. For this reason, an illumination unit composed of a so-called integrator optical system, capable of illuminating the illumination area on which an image is formed at a roughly uniform light intensity distribution is used as the illumination unit. See, e.g., JP-A-2002-55208 (FIGS. 1 to 3).

FIG. 13 is a schematic showing a related art illumination unit. FIGS. 14(a)–(c) are schematics for illustrating the integrator optical system in the related art illumination unit. FIG. 14(a) is a perspective view of a first lens array and a second lens array. FIG. 14(b) is a front view of the first lens array. FIG. 14(c) is a schematic showing the image formation area of a liquid crystal device as the electrooptic modulation unit which is the illuminated area. FIG. 15 is a schematic showing the light intensity distribution on the light incident surface of the first lens array in the related art illumination unit.

A related art illumination unit 900 includes a light source unit 910 and an integrator optical system 960 as shown in FIG. 13.

The light source unit 910 has an arc tube 912, an ellipsoidal reflector 914, and a collimating lens 916. Thus, with this configuration, the light radiated from the arc tube 912 is reflected by the ellipsoidal reflector 914, and emitted toward the illuminated area. The light from the ellipsoidal reflector 914 is converted into roughly parallel illumination luminous fluxes at the collimating lens 916, and emitted.

The integrator optical system 960 has a first lens array 920 having a plurality of small lenses 922, a second lens array 930 having a plurality of small lenses 932, a polarized-light converting element 940, and a superimposing lens 950. Thus, with this configuration, the first lens array 920 splits an illumination luminous flux from the light source unit 910 into a plurality of partial luminous fluxes. The plurality of the partial luminous fluxes are superimposed on the image formation area LA of the liquid crystal device by the second lens array 930 and the superimposing lens 950. The longitudinal to transverse dimension ratio of the image formation area LA of the liquid crystal device is, as shown in FIG. 14(c), set as a ratio of longitudinal dimension ($D_y$):transverse dimension ($D_x$)=3:4.

This illumination unit 900 enables the implementation of an illumination luminous flux having a roughly uniform light intensity distribution on the image formation area LA of the liquid crystal device even when the light intensity distribution of the illumination luminous flux emitted from the light source unit 910 is nonuniform.

In such an illumination unit, the light radiated from the arc tube is intercepted by the arc tube itself. For this and other reasons, as shown in FIG. 15, an area with an extremely small light intensity (hereinafter "a shadow area") S occurs at the light incident surface central part of the first lens array. Therefore, in order to achieve an illumination luminous flux having a roughly uniform light intensity distribution on the image formation area of the liquid crystal device, the number of the small lenses in the first lens array may be set at a large value to a certain degree. Whereas, in order to achieve the enhancement of the light use efficiency, and the reduction of the stray light level in the projector, the lens shape of each small lens in the first lens array may be similar to that of the image formation area of the liquid crystal device, and the shape of the first lens array may be a square.

Under such circumstances, in the related art illumination unit 900, as shown in FIG. 14, the first lens array 920 is configured to have 48 small lenses 922 arrayed in a matrix with eight rows by six columns in the transverse direction and in the longitudinal direction, respectively. Whereas, the longitudinal to transverse dimension ratio of each small lens 922 is set at a ratio of longitudinal dimension ($d_A$):transverse dimension ($d_B$)=3:4, and the shape of the first lens array 920 is set to be a square.

SUMMARY OF THE INVENTION

However, in the related art illumination unit 900, the number of the small lenses 922 in the first lens array 920 is as large as forty-eight. Hence, the surface area occupied by the individual small lenses 922 relative to the total surface area of the first lens array 920 is small. As a result, the lens density becomes high, so that the manufacturing processing of the first lens array becomes complicated. This unfavorably incurs a rising manufacturing cost.

Under such circumstances, exemplary aspects of the present invention have been made in order to address and/or solve such and/or other problems. Exemplary aspects of the invention provide an illumination unit capable of simplifying the manufacturing processing of the first lens array, and reducing the manufacturing cost without reducing the inplane light intensity distribution characteristics on the image formation area of an electrooptic modulation unit which is the illuminated area, and a projector including the same.

The illumination unit of an exemplary aspect of the invention includes: an ellipsoidal reflector having a first focus and a second focus; an arc tube having a light emitting portion in the vicinity of the first focus; a collimating lens to convert a light from the ellipsoidal reflector into a roughly parallel illumination luminous flux; a first lens array having a plurality of small lenses to split the illumination luminous flux from the collimating lens into a plurality of partial luminous fluxes; a second lens array having a plurality of small lenses corresponding to the plurality of small lenses of the first lens array; and a superimposing lens to superimpose respective partial luminous fluxes from the second lens array at the illuminated area, characterized in that the light incident surface of the first lens array is situated at a position which is closer to the ellipsoidal reflector than the second focus, and which is such that the light quantity of the illumination luminous flux from the collimating lens is distributed throughout over the light incident surface.

Thus, in accordance with the illumination unit of an exemplary aspect of the invention, the light incident surface of the first lens array is situated at such a position that the light quantity of the illumination luminous flux from the collimating lens is distributed throughout over the light incident surface. This can make more uniform the inplane light intensity distribution on the light incident surface of the first lens array. As a result, when the illumination unit of an exemplary aspect of the invention is used for a projector, it is possible to suppress the reduction of the inplane light intensity distribution characteristics on the image formation area of an electrooptic modulation unit which is the illuminated area.

Further, in accordance with the illumination unit of an exemplary aspect of the invention, it is possible to make more uniform the inplane light intensity distribution on the light incident surface of the first lens array. This can reduce the number of the small lenses in the first lens array, thereby to make the lens density relatively low. This enables the simplification of manufacturing processing and the reduction of the cost of the first lens array.

As a result, the illumination unit of an exemplary aspect of the invention becomes an illumination unit capable of achieving the simplification of manufacturing processing and the reduction of the manufacturing cost of the first lens array without reducing the inplane light intensity distribution characteristics on the image formation area of the electrooptic modulation unit which is the illuminated area.

In the illumination unit of an exemplary aspect of the invention, the first lens array may be disposed at such a position that a shadow area is not present at the light incident surface central part of the first lens array.

With such a configuration, the total amount of the illumination luminous fluxes from the collimating lens are distributed throughout over the light incident surface of the first lens array.

In the illumination unit of an exemplary aspect of the invention, the plurality of the small lenses of the first lens array may be arrayed in a matrix with six rows by four columns in the transverse direction and in the longitudinal direction, respectively, and disposed at the positions corresponding to the respective rows and respective columns of the matrix.

With such a configuration, it is possible to set the number of small lenses in the first lens array at twenty-four, which enables the reduction of the number of the lenses. This enables the simplification of manufacturing processing and the reduction of the cost of the first lens array.

Further, in the illumination unit of an exemplary aspect of the invention, the plurality of small lenses of the first lens array may be arrayed in a matrix with six rows by four columns in the transverse direction and in the longitudinal direction, respectively, and disposed at the matrix positions except for the positions corresponding to the first row/first column, the first row/fourth column, the sixth row/first column, and the sixth row/fourth column of the matrix.

With such a configuration, it is possible to set the number of the small lenses in the first lens array at twenty, which enables the further reduction of the number of the lenses.

Further, in the illumination unit of an exemplary aspect of the invention, the longitudinal to transverse dimension ratio of the plurality of the small lenses of the first lens array may be set at a ratio of longitudinal dimension:transverse dimension=3:4.

With such a configuration, when the electrooptic modulation unit in which the longitudinal to transverse dimension ratio of the image formation area is set at a ratio of longitudinal dimension:transverse dimension=3:4 is illuminated, it is possible to achieve the enhancement of the light use efficiency and the reduction of the stray light level.

Still further, in the illumination unit of an exemplary aspect of the invention, the effective diameter of the collimating lens may be set at roughly the same dimension as the maximum longitudinal dimension of the first lens array.

Furthermore, in the illumination unit of an exemplary aspect of the invention, the effective diameter of the collimating lens may be set at roughly the same dimension as the maximum transverse dimension of the first lens array.

With such a configuration, when the effective diameter of the collimating lens has been set at roughly the same dimension as the maximum longitudinal dimension of the first lens array, it is possible to make more uniform the inplane light intensity distribution on the light incident surface of the first lens array. Whereas, when the effective diameter of the collimating lens has been set at roughly the same dimension as the maximum transverse dimension of the first lens array, it is possible to enhance the light use efficiency in the first lens array.

Further, in the illumination unit of an exemplary aspect of the invention, the longitudinal to transverse dimension ratio of the plurality of the small lenses of the first lens array may be set at a ratio of longitudinal dimension:transverse dimension=2:3.

Still further, in the illumination unit of an exemplary aspect of the invention, the effective diameter of the collimating lens may be set at roughly the same dimension as the maximum longitudinal dimension and the maximum transverse dimension of the first lens array.

With such a configuration, it is possible to make the shape of the first lens array square. Whereas, the effective diameter of the collimating lens is set at roughly the same dimension as the maximum longitudinal dimension and the maximum transverse dimension of the first lens array. Therefore, the illumination luminous flux from the collimating lens can be made to be the inscribed circle of the first lens array. For this reason, it is possible to suppress the reduction of the inplane light intensity distribution characteristics on the light incident surface of the first lens array. This can achieve the enhancement of the light use efficiency in the first lens array Further, the illumination unit of an exemplary aspect of the invention further includes an optical element to correct the longitudinal to transverse dimension ratio of the illumination luminous flux from the first lens array in order to set the longitudinal to transverse dimension ratio of the cross section of the illumination luminous flux in the illuminated area at a ratio of longitudinal dimension:transverse dimension=3:4.

With such a configuration, the longitudinal to transverse dimension ratio of the illumination luminous flux emitted from the first lens array is corrected to a ratio of longitudinal dimension:transverse dimension=3:4 on the image formation area of the electrooptic modulation unit which is the illuminated area. Accordingly, it is possible to achieve the enhancement of the light use efficiency and the reduction of the stray light level in the projector.

Further, in the illumination unit of an exemplary aspect of the invention, the plurality of the small lenses of the first lens array may be arrayed in a matrix with seven rows by four columns in the transverse direction and in the longitudinal direction, respectively, and disposed at the positions corresponding to the respective rows/respective columns of the matrix.

With such a configuration, it is possible to set the number of the small lenses in the first lens array at twenty-eight, which enables the reduction of the number of the lenses. This enables the simplification of manufacturing processing and the reduction of the cost of the first lens array.

Further, in the illumination unit of an exemplary aspect of the invention, the plurality of small lenses of the first lens array are arrayed in a matrix with seven rows by four columns in the transverse direction and in the longitudinal direction, respectively, and disposed at the matrix positions except for the positions corresponding to the first row/first column, the first row/fourth column, the seventh row/first column, and the seventh row/fourth column of the matrix.

With such a configuration, it is possible to set the number of the small lenses in the first lens array at twenty-four, which enables the further reduction of the number of the lenses.

Further, in the illumination unit of an exemplary aspect of the invention, the longitudinal to transverse dimension ratio of the plurality of the small lenses of the first lens array is set at a ratio of longitudinal dimension:transverse dimension=9:16.

With such a configuration, for illuminating an electrooptic modulation unit for wide vision in which the longitudinal to transverse dimension ratio of the image formation area is set at a ratio of longitudinal dimension:transverse dimension=9:16, it is possible to achieve the enhancement of the light use efficiency and the reduction of the stray light level in the projector.

Further, in the illumination unit of an exemplary aspect of the invention, the maximum longitudinal dimension and the maximum transverse dimension in the second lens array may be set larger than the maximum longitudinal dimension and the maximum transverse dimension in the first lens array, respectively.

With such a configuration, it is possible to increase the size of each small lens in the second lens array to a certain degree. For this reason, it becomes easy to put the arc image formed by each small lens in the first lens array within each small lens in the second lens array. This facilitates the achievement of the enhancement of the light use efficiency.

Further, in the illumination unit of an exemplary aspect of the invention, the first lens array and the second lens array may be integrally formed.

With such a configuration, the illumination luminous flux emitted from the first lens array is made incident upon the second lens array without passing through the air layer. This results in no occurrence of the reflection of light, or the like, at the light emitting surface of the first lens array or the light incident surface of the second lens array. Therefore, it becomes possible to suppress the loss of the light quantity due to such undesirable reflection or the like. Further, it becomes unnecessary to carry out the alignment between the first lens array and the second lens array for assembly of the illumination unit. In addition, after the assembly of the illumination unit, it becomes possible to suppress the deterioration of the positional precision of the first lens array and the second lens array.

Further, the illumination unit of an exemplary aspect of the invention may further include a light transmitting portion to guide a light from the first lens array to the second lens array between the first lens array and the second lens array. The first lens array and the second lens array are bonded through the light transmitting portion.

With such a configuration, the illumination luminous flux emitted from the first lens array is made incident upon the second lens array without passing through the air layer. This enables the suppression of the reflection of light, or the like, at the light emitting surface of the first lens array or the light incident surface of the second lens array. For this reason, it becomes possible to reduce the loss of the light quantity due to such undesirable reflection. Further, for the assembly of the illumination unit, the first lens array and the second lens array are aligned in advance, and then, bonded to the light transmitting portion. This results in that only the alignment between the lens array unit having the first lens array and the second lens array and other optical components is required. For this reason, it becomes possible to carry out the alignment between the respective optical components in the illumination unit with ease.

With the illumination unit of an exemplary aspect of the invention, different from the foregoing case where the first lens array and the second lens array are integrally formed, the lens array unit having the first lens array and the second lens array can be manufactured in the following manner. The respective ones are individually formed as separate members and then, these are bonded to each other by an adhesive or the like. This also produces an effect of easier manufacturing as compared with the case where the first lens array and the second lens array are integrally formed.

In the illumination unit of an exemplary aspect of the invention, the light transmitting portion may have almost the same refractive index as that of the first lens array and the second lens array.

Further, the adhesive for bonding between the first lens array and the light transmitting portion, and between the light transmitting portion and the second lens array also may have almost the same refractive index as that of the first lens array and the second lens array.

With such a configuration, it becomes possible to further suppress the reflection of the light or the like at the interface between each of the first lens array and the second lens array, and the light transmitting portion. This enables the further reduction of the loss of the light quantity due to such undesirable reflection or the like.

Whereas, in the illumination unit of an exemplary aspect of the invention, the light transmitting portion may have almost the same coefficient of linear expansion as that of the first lens array and the second lens array.

With such a configuration, it becomes possible to suppress the generation of thermal stress with the temperature change due to use of the projector. Accordingly, it becomes possible to suppress the damages at the bonding portions between the first lens array and the second lens array, and the light transmitting portion.

From these, in the illumination unit of an exemplary aspect of the invention, the light transmitting portion may be composed of the same base material as that for the first lens array and the second lens array.

Further, the illumination unit of an exemplary aspect of the invention may further include a reflection device which is disposed on the illuminated area side of the arc tube, and reflects a light radiated from the light emitting portion toward the illuminated area to the ellipsoidal reflector.

With such a configuration, the light radiated from the arc tube toward the illuminated area is reflected by the ellipsoidal reflector. This eliminates the necessity of setting the size of the ellipsoidal reflector at such a size as to cover even the edge of the arc tube on the illuminated area side, which enables reduction in size of the ellipsoidal reflector. As a result, it is possible to achieve reduction in size of the illumination unit.

Further, since the reduction in size of the ellipsoidal reflector can be achieved, it is possible to reduce the convergent angle of the beams converging from the ellipsoidal reflector toward the second focus of the ellipsoidal reflector, and the diameter of the beam spot. Accordingly, it is possible to further reduce respective optical elements of the subsequent stages including the collimating lens, which enables the further reduction in size of the illumination unit.

A projector of an exemplary aspect of the invention is characterized by including the illumination unit of an exemplary aspect of the invention, an electrooptic modulation unit to modulate an illumination luminous flux from the illumination unit in response to image information, and a projection optical system to project the modulated light from the electrooptic modulation unit.

Thus, the projector of an exemplary aspect of the invention includes the excellent illumination unit capable of achieving the simplification of manufacturing processing and the reduction of the manufacturing cost of the first lens array without reducing the inplane light intensity distribution characteristics on the image formation area of the electrooptic modulation unit, and hence it is a low-price high image quality projector.

DETAILED DESCRIPTION OF EXEMPLARY EMBODIMENTS

Below, an illumination unit and a projector including the same of the present invention will be described based on exemplary embodiments shown in the accompanying drawings.

Exemplary Embodiment 1

Figure 1:
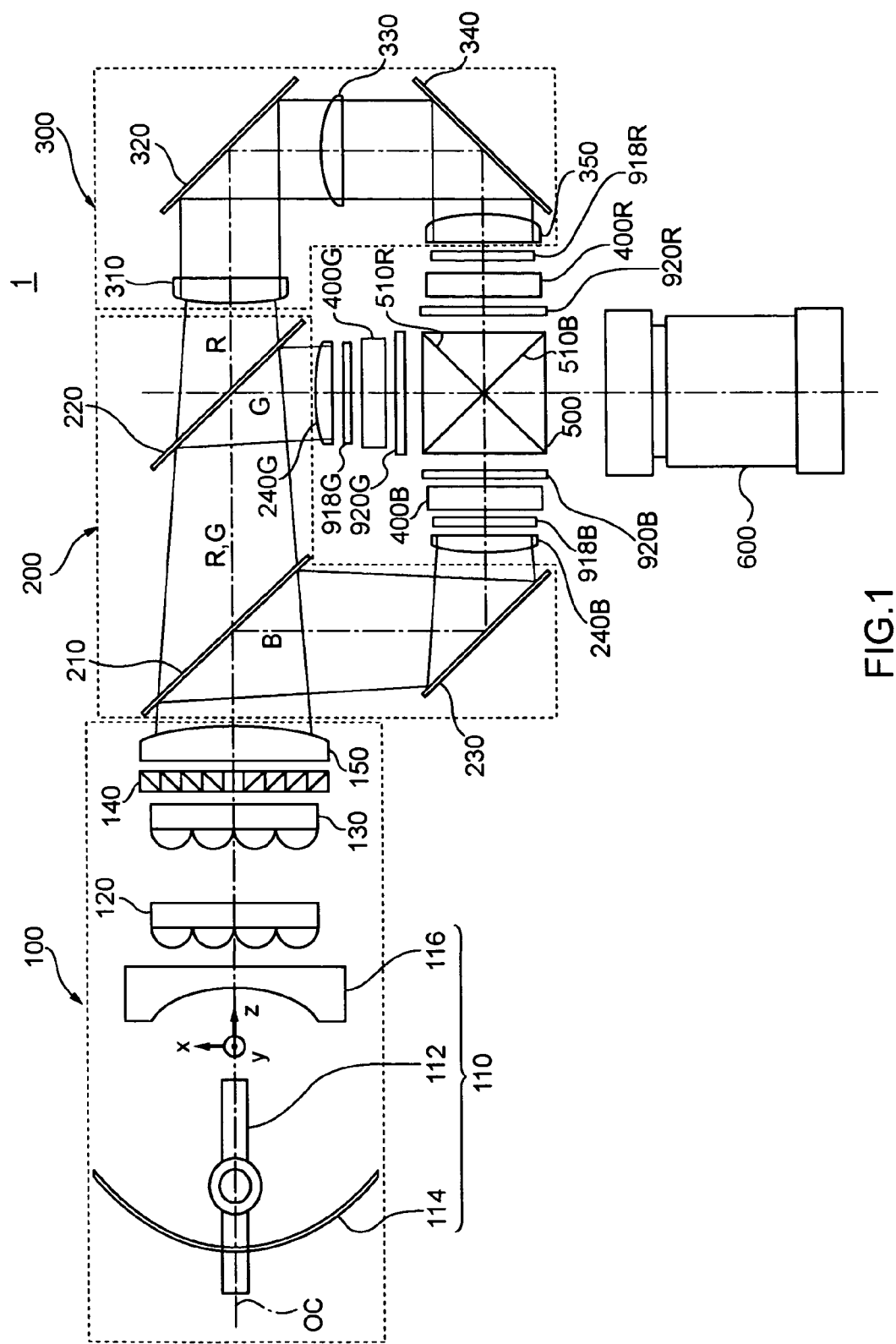
FIG. 1 is a schematic to illustrate an optical system of a projector in accordance with exemplary Embodiment 1.

FIG. 1 is a schematic shown for illustrating an optical system of a projector in accordance with exemplary Embodiment 1. In the following description, the mutually orthogonal three directions are referred to as a z direction (direction parallel to the system optical axis), an x direction (direction perpendicular to the z direction and parallel to the paper plane), and a y direction (direction perpendicular to the paper plane).

A projector 1 in accordance with exemplary Embodiment 1 includes, as shown in FIG. 1, an illumination unit 100, a color separating optical system 200, a relay optical system 300, three liquid crystal devices 400R, 400G, and 400B as electrooptic modulation units, a cross dichroic prism 500, and a projection optical system 600.

The illumination unit 100 has a light source unit 110, a first lens array 120, a second lens array 130, a polarized-light converting element 140, and a superimposing lens 150. The illumination luminous flux emitted from the light source unit 110 is split into a plurality of partial luminous fluxes by the first lens array 120. The respective partial luminous fluxes are superimposed on the image formation areas of the three liquid crystal devices 400R, 400G, and 400B, which are objects to be illuminated, by the second lens array 130 and the superimposing lens 150.

The details of the illumination unit 100 will be described later. Whereas, the respective small lenses in the first lens array 120 and the second lens array 130 shown in FIG. 1 (likewise for FIGS. 2, 5, and 8) are shown as to the decentering in abstraction.

The color separating optical system 200 has a function of separating the illumination luminous flux emitted from the illumination unit 100 into illumination luminous fluxes of three colors of mutually different wavelength regions. A first dichroic mirror 210 reflects a roughly blue luminous flux (hereinafter "B light"), and transmits a roughly green luminous flux (hereinafter "G light") and a roughly red luminous flux (hereinafter "R light"). The B light reflected by the first dichroic mirror 210 is further reflected by a reflection mirror 230, and is transmitted through a field lens 240B to illuminate the liquid crystal device 400B for B light.

The field lens 240B converges light so that a plurality of partial luminous fluxes from the illumination unit 100 each illuminate the liquid crystal device 400B for B light. In general, it is set such that the respective partial luminous fluxes become roughly parallel luminous fluxes. Field lenses 240G and 350 disposed in front of the other liquid crystal devices 400G and 400R, respectively, are also configured as with the field lens 240B.

The G light, out of the G light and R light transmitted through the first dichroic mirror 210, is reflected by the second dichroic mirror 220, and is transmitted through the field lens 240G to illuminate the liquid crystal device 400G for G light. R light is transmitted through the second dichroic mirror 220, and passes through the relay optical system 300 to illuminate the liquid crystal device 400R for R light.

The relay optical system 300 has an incident-side lens 310, an incident-side reflection mirror 320, a relay lens 330, an outgoing-side reflection mirror 340, and a field lens 350. The R light emitted from the color separating optical system 200 converges in the vicinity of the relay lens 330 by the incident-side lens 310, and diverges toward the outgoing-side reflection mirror 340 and the field lens 350. The magnitude of the luminous flux to be made incident upon the field lens 350 is set so as to be roughly equal to the magnitude of the luminous flux to be made incident upon the incident-side lens 310.

The liquid crystal devices 400R, 400G, and 400B for respective colors convert color lights incident upon their respective light incident surfaces into lights responsive to their respective corresponding image signals, and emit these converted lights as transmitted lights. Incident-side polarizing plates 918R, 918G, and 918B are disposed on the incident sides of the liquid crystal devices 400R, 400G, and 400B, respectively. Outgoing-side polarizing plates 920R, 920G, and 920B are respectively disposed on the outgoing sides thereof. The liquid crystal devices 400R, 400G, and 400B to be used are transmission type liquid crystal devices in each of which the longitudinal to transverse dimension ratio of the image formation area is set at a ratio of longitudinal dimension:transverse dimension=3:4.

The cross dichroic prism 500 has a function as a color synthesizing optical system to synthesize the converted lights of respective colors emitted from the liquid crystal devices 400R, 400G, and 400B for respective colors. Thus, it has a R light reflection dichroic surface 510R to reflect R light and a B light reflection dichroic surface 510B to reflect B light. The R light reflection dichroic surface 510R and the B light reflection dichroic surface 510B are disposed by forming a dielectric multilayer film to reflect R light and a dielectric multilayer film to reflect B light roughly in the form of a letter X on the interfaces between four rectangular prisms. The converted lights of three colors are synthesized by both the reflection dichroic surfaces 510R and 510B, so that a light for displaying a color image is generated. The synthesized light generated at the cross dichroic prism 500 is emitted toward the projection optical system 600.

The projection optical system 600 is configured such that the synthesized light from the cross dichroic prism 500 is projected as a display image on the projection surface such as a screen.

Figure 2:
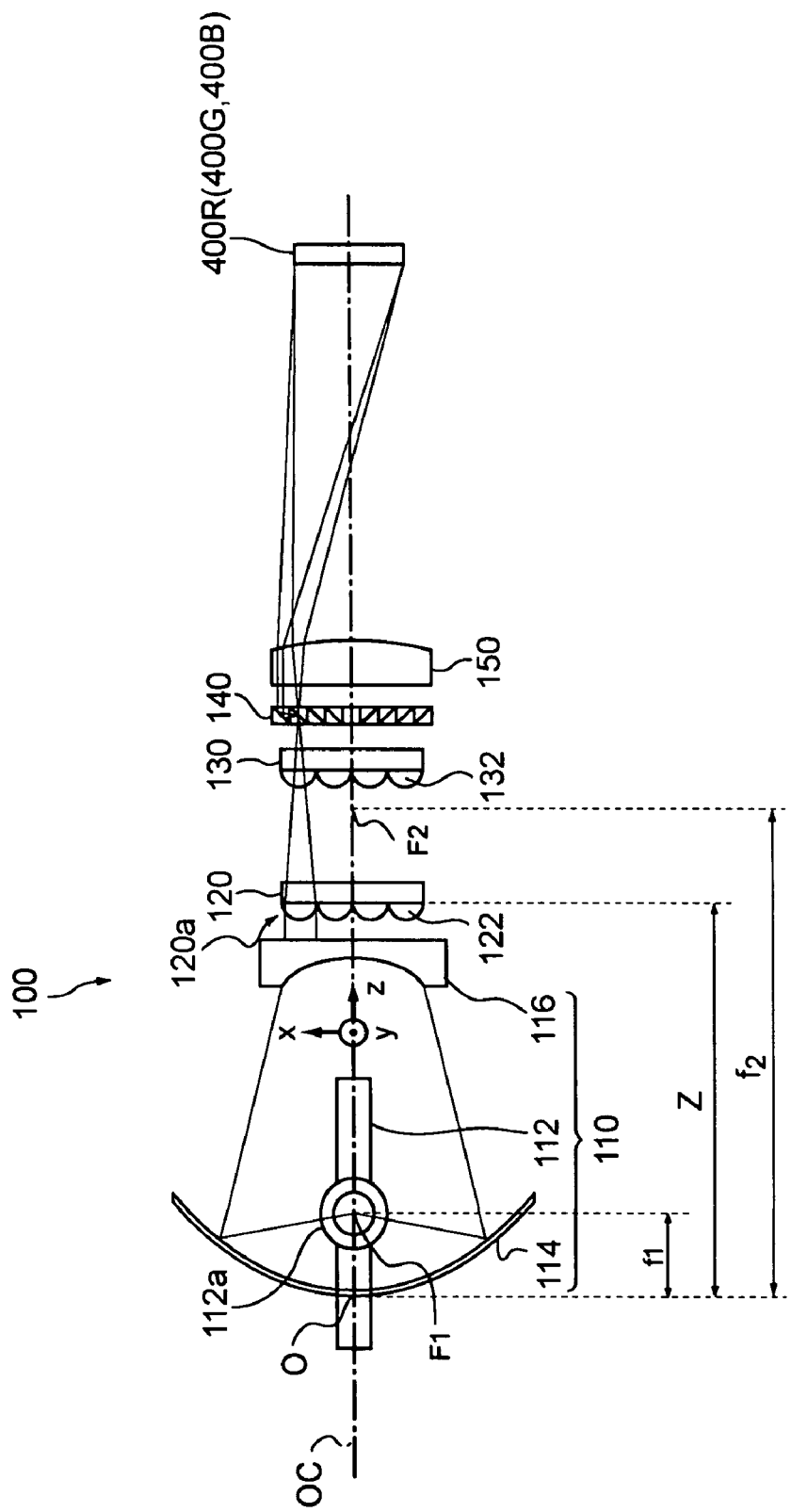
FIG. 2 is a schematic to illustrate an illumination unit in accordance with exemplary Embodiment 1.
Figure 3:
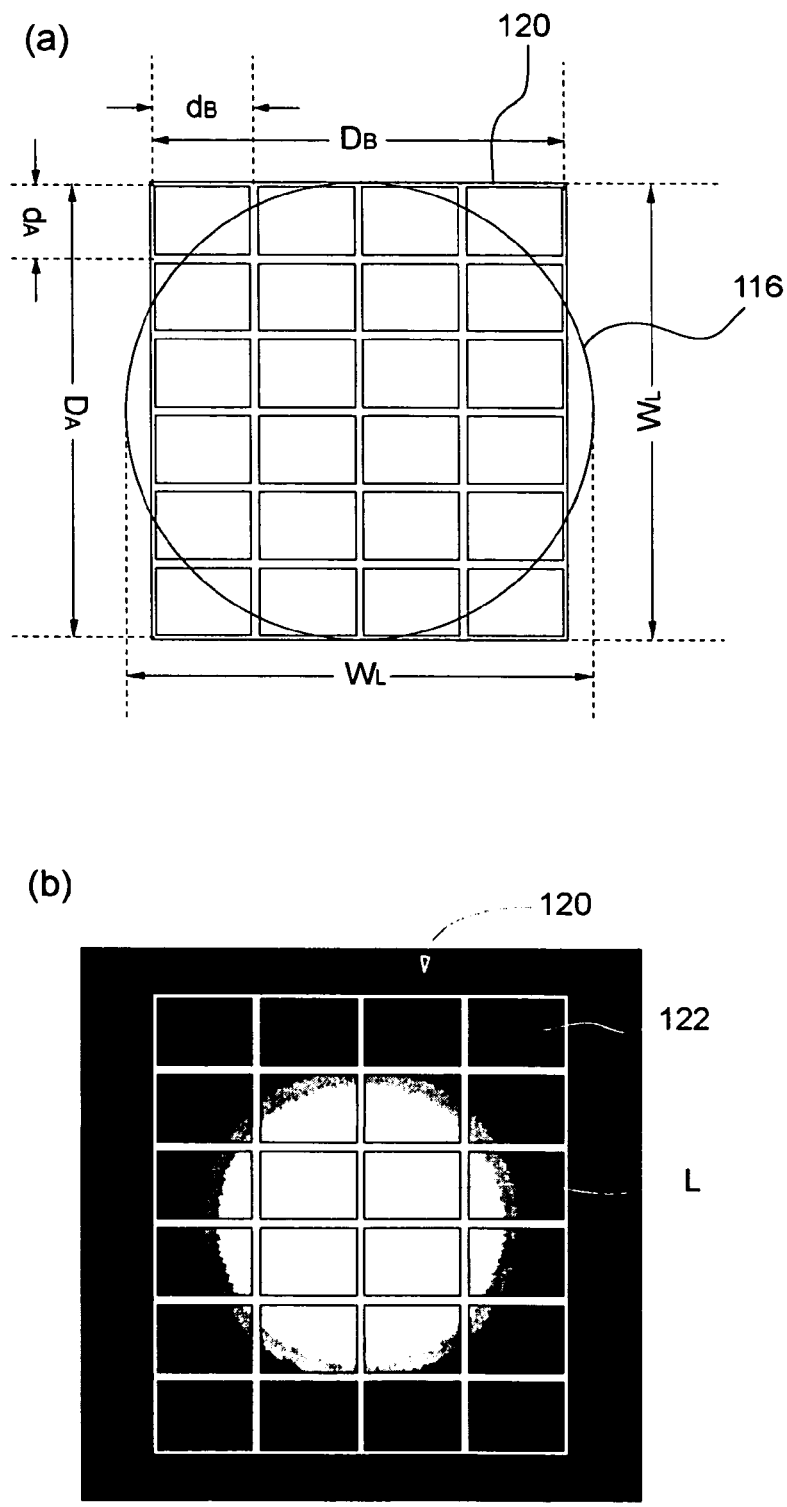
FIGS. 3(a) and 3(b) are schematics to illustrate a first lens array in exemplary Embodiment 1.
Figure 4:
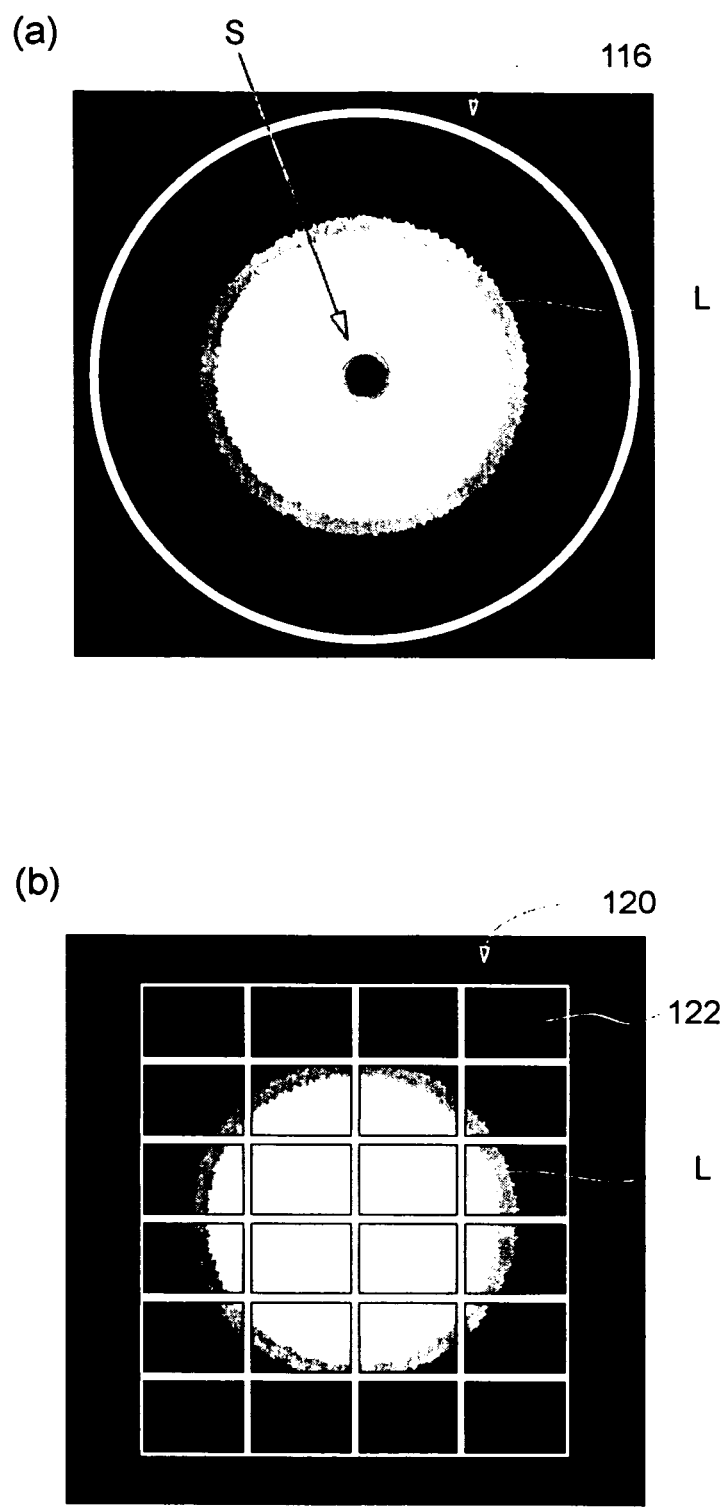
FIGS. 4(a) and 4(b) are schematics to illustrate the first lens array in exemplary Embodiment 1.
Figure 5:
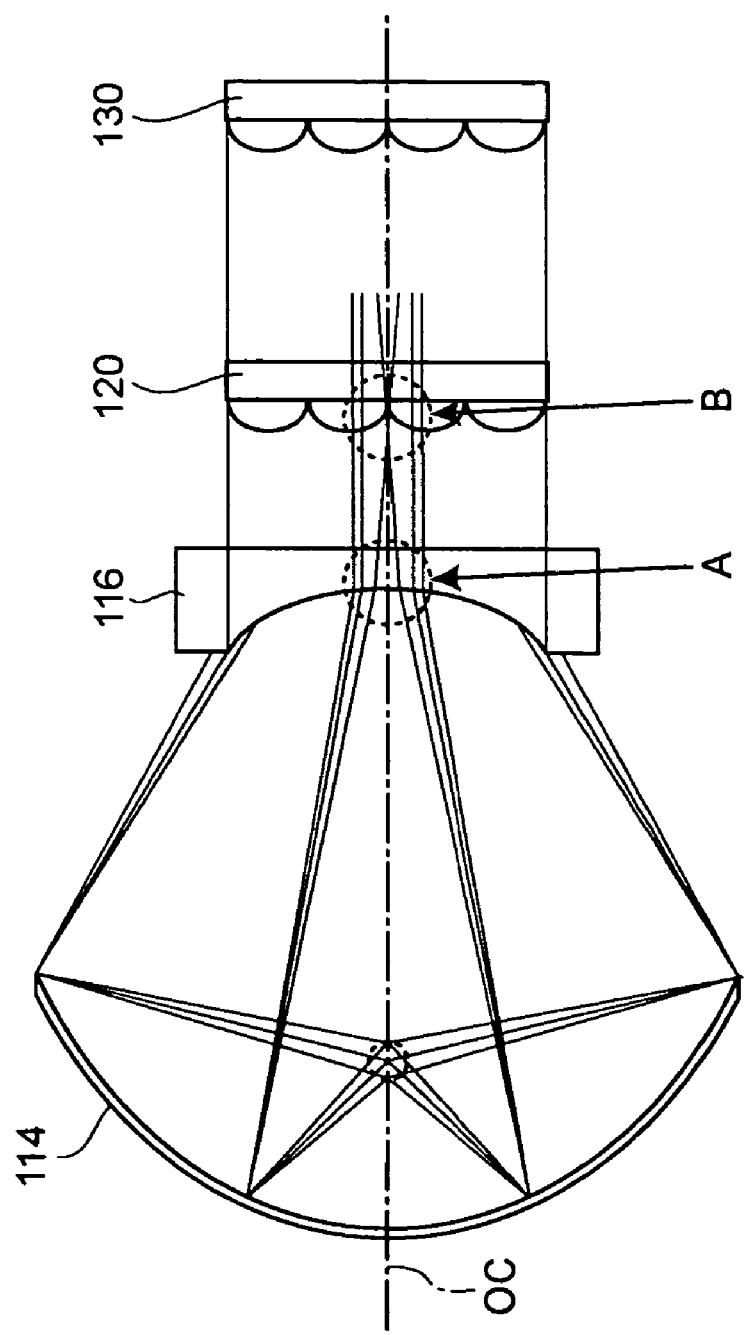
FIG. 5 is a schematic showing the path of a luminous flux in an essential part of the illumination unit in accordance with exemplary Embodiment 1.

Then, an illumination unit in accordance with exemplary Embodiment 1 will be described in detail by reference to FIGS. 2 to 5. FIG. 2 is a schematic to illustrate the illumination unit in accordance with exemplary Embodiment 1. FIGS. 3(*a*) and 3(*b*) are schematics to illustrate a first lens array in exemplary Embodiment 1. FIG. 3(*a*) is a schematic showing the first lens array as seen from the front along the system optical axis. FIG. 3(*b*) is a schematic showing the light intensity distribution on the light incident surface of the first lens array. FIG. 4 are schematics to illustrate the first lens array in exemplary Embodiment 1. FIG. 4(*a*) is a schematic showing the light intensity distribution on the light incident surface of the collimating lens. FIG. 4(*b*) is a schematic showing the light intensity distribution on the light incident surface of the first lens array. FIG. 5 is a schematic to show the path of the luminous flux in an essential part of the illumination unit in accordance with exemplary Embodiment 1. The portion of the luminous flux is shown in gray.

The illumination unit 100 in accordance with exemplary Embodiment 1 has, as shown in FIG. 2, a light source unit 110, a first lens array 120, a second lens array 130, a polarized-light converting element 140, and a superimposing lens 150.

The light source unit 110 has an arc tube 112, and an ellipsoidal reflector 114, and a collimating lens 116.

The arc tube 112 is composed of, for example, quartz glass, and has a light emitting portion 112*a* and sealing portions bonded to the opposite sides of the light emitting portion 112*a*. The light emitting portion 112*a* is hollow, and mercury, a rare gas, and a halogen are sealed in the inside thereof. The light emitting portion 112*a* is disposed in the vicinity of the position of the first focus $F_1$ of the ellipsoidal reflector 114.

As the arc tube 112, for example, a high pressure mercury lamp is used. Other lamps such as a metal halide lamp and a xenon lamp may also be used.

The ellipsoidal reflector 114 opens toward the illuminated area, and is disposed at the rear of the light emitting portion 112*a* of the arc tube 112. Further, it has a first focus $F_1$ and a second focus $F_2$ placed at a prescribed spacing on the system optical axis OC. The first focus $F_1$ and the second focus $F_2$ are placed at the positions separated from the imaginary point O of intersection of the imaginary ellipsoid continuous to the ellipsoid of the ellipsoidal reflector 114 and the system optical axis OC by optical lengths $f_1$=12 mm and $f_2$=60 mm, respectively.

The collimating lens 116 is composed of a concave lens, and placed on the illuminated area side of the ellipsoidal reflector 114. Thus, it is configured so as to roughly collimate the light from the ellipsoidal reflector 114. Herein, in this specification, the wording "to roughly collimate the light from the ellipsoidal reflector 114" is used as the meaning inclusive of a case that the illumination luminous flux emitted from the collimating lens is emitted slightly outwardly, as with a collimating lens 116B (see, FIG. 9) for use in an illumination unit in accordance with exemplary Embodiment 5 described later.

The effective diameter of the collimating lens 116 is set as roughly the same dimension as the longitudinal dimension of the first lens array 120 as shown in FIG. 3(*a*).

The first lens array 120 has, as shown in FIGS. 2 to 5, a plurality of small lenses 122, and disposed on the illuminated area side of the collimating lens 116. Thus, it is configured such that the illumination luminous flux roughly collimated by the collimating lens 116 is split into a plurality of partial luminous fluxes. Further, it is configured such that the light incident area 120*a* is positioned closer to the ellipsoidal reflector than the second focus $F_2$ of the ellipsoidal reflector 114 (at a position separated from the imaginary point O by an optical length Z=55 mm). This causes the luminous flux L emitted from the collimating lens 116 to have a light quantity distributed throughout over the light incident area 120*a* of the first lens array 120 (see, FIG. 2), i.e., eliminates the shadow of the arc tube 112.

In the illumination unit 100 in accordance with exemplary Embodiment 1, the collimating lens 116 is, as shown in FIGS. 4(*a*) and 5, disposed at such a position A on the system optical axis OC that an area with an extremely small incident light intensity (shadow area) S is present at the light incident surface central part. In contrast, the first lens array 120 is, as shown in FIGS. 4(*b*) and 5, disposed at such a position B on the system optical axis OC that an area with an extremely small incident light intensity (shadow area) S is not present at the light incident surface central part, i.e., at a position separated from the imaginary point O (see, FIG. 2) by an optical length Z=55 mm.

In the illumination unit 100 in accordance with exemplary Embodiment 1, the small lenses 122 of the first lens array 120 are, as shown in FIG. 3(*a*), arrayed in a matrix with six rows by four columns in the transverse direction and in the longitudinal direction, respectively, in the plane orthogonal to the system optical axis OC, and, disposed at the positions corresponding to the respective rows/respective columns of the matrix. This can set the number of the small lenses 122 in the first lens array 120 at twenty-four, which enables the reduction of the number of the lenses. This enables the simplification of manufacturing processing and the reduction of the cost of the first lens array.

In the illumination unit 100 in accordance with exemplary Embodiment 1, the longitudinal to transverse dimension ratio of the small lens 122 of the first lens array 120 is set at a ratio of longitudinal dimension ($d_A$):transverse dimension ($d_B$)=3:4. As a result, when the liquid crystal device in which the longitudinal to transverse dimension ratio of the image formation area is set at a ratio of longitudinal dimension:transverse dimension=3:4 is illuminated, it is possible to achieve the enhancement of the light use efficiency and the reduction of the stray light level.

In the illumination unit 100 in accordance with exemplary Embodiment 1, the effective diameter $W_L$ of the collimating lens 116 is set at roughly the same dimension as the maximum longitudinal dimension $D_A$ of the first lens array 120 as shown in FIG. 3(a). This can make more uniform the inplane light intensity distribution in the light incident surface of the first lens array.

The second lens array 130 has, as shown in FIG. 2, a plurality of small lenses 132 corresponding to the small lenses 122 of the first lens array 120, and disposed on the illuminated area side of the first lens array 120. Thus, it is configured such that the respective partial luminous fluxes split by the first lens array 120 are made into partial luminous fluxes parallel to the system optical axis OC, and such that the respective partial luminous fluxes are superimposed on the image formation areas of the liquid crystal devices 400R, 400G, and 400B in cooperation with the superimposing lens 150.

The small lenses 132 of the second lens array 130 are arrayed in a matrix with six rows by four columns in the transverse direction and in the longitudinal direction, respectively, in the plane orthogonal to the system optical axis OC as with the small lenses 122 of the first lens array 120, and, disposed at the positions corresponding to the respective rows/respective columns of the matrix. This can set the number of small lenses 132 in the second lens array 130 at 24, which enables the reduction of the number of the lenses. This enables the simplification of manufacturing processing and the reduction of the cost of the second lens array.

The small lenses 122 of the first lens array 120 may also be configured to be arrayed in a matrix with six rows by four columns in the transverse direction and in the longitudinal direction, respectively, in the plane orthogonal to the system optical axis OC, and to be disposed at the matrix positions except for the positions corresponding to the first row/first column, the first row/fourth column, the sixth row/first column, and the sixth row/fourth column of this matrix. This can set the number of the small lenses 122 in the first lens array 120 at 20, which further enables the reduction of the number of the lenses.

In this case, the small lenses 132 of the second lens array 130 may also be configured to be disposed at the matrix positions except for the positions corresponding to the first row/first column, the first row/fourth column, the sixth row/first column, and the sixth row/fourth column of the matrix with six rows/four columns, correspondingly to the layout of the small lenses 122 of the first lens array 120. This can set the number of the small lenses 132 in the second lens array 130 at 20, which further enables the reduction of the number of the lenses.

Figure 13:
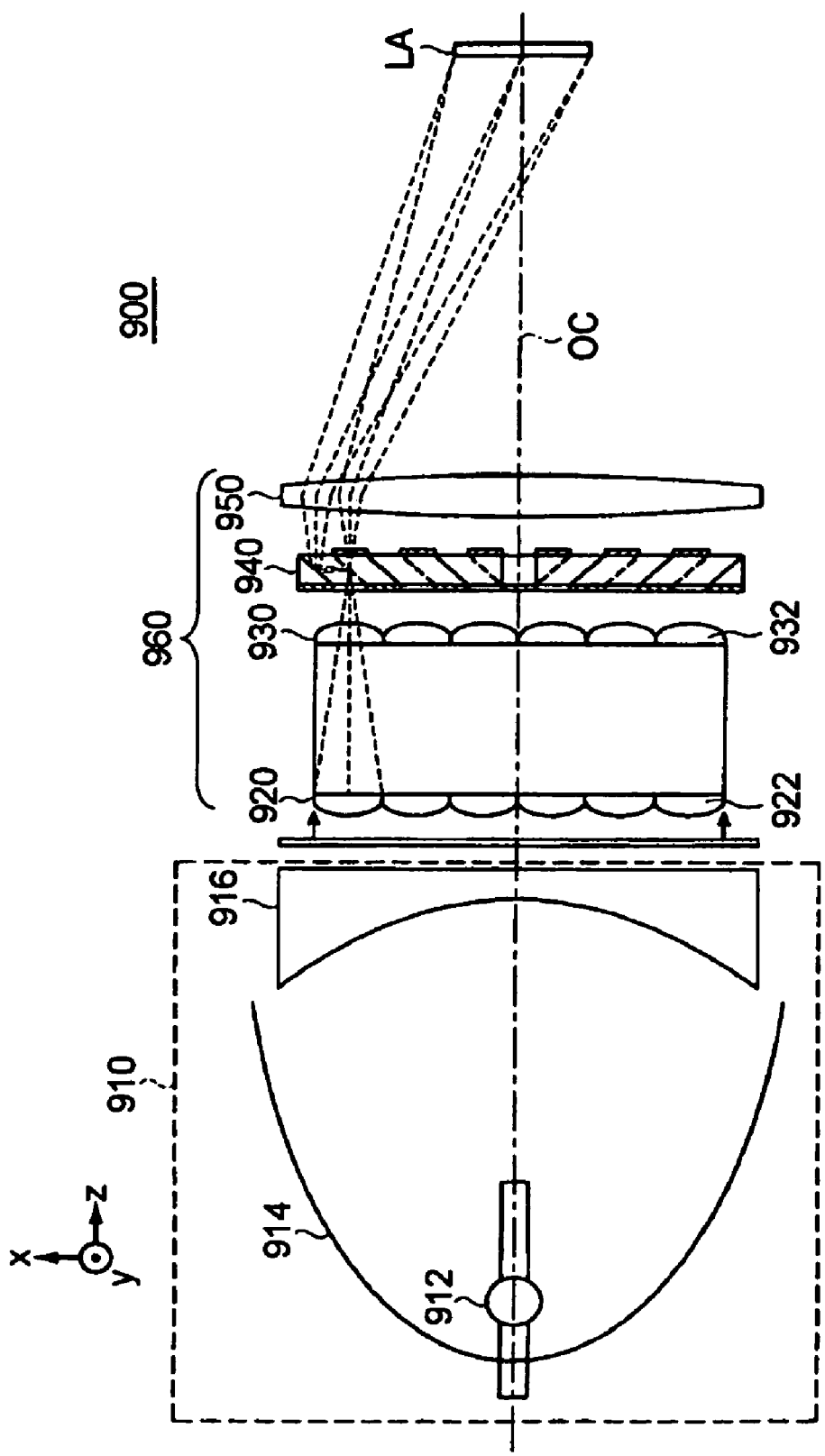
FIG. 13 is a schematic showing a related art illumination unit.
Figure 14:
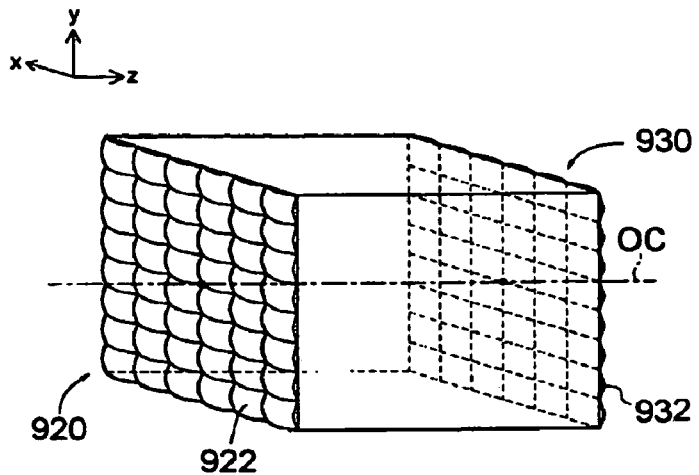
FIGS. 14(a)–14(c) are schematics to illustrate an integrator optical system in the related art illumination unit.
Figure 14:
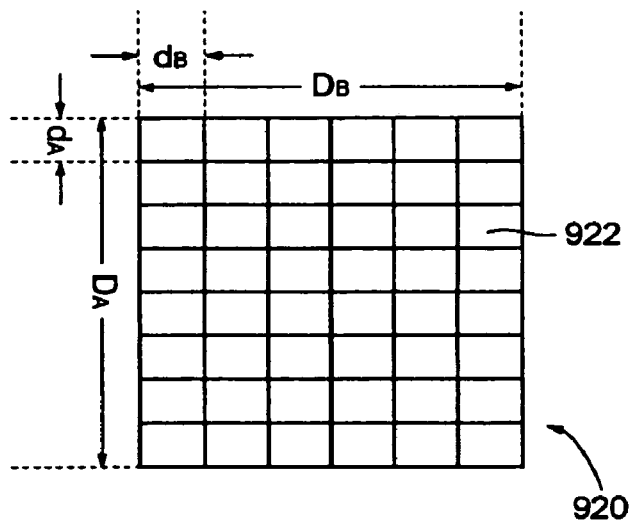
Figure 14:
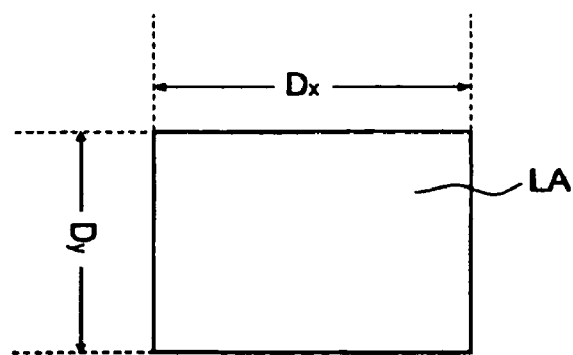
Figure 15:
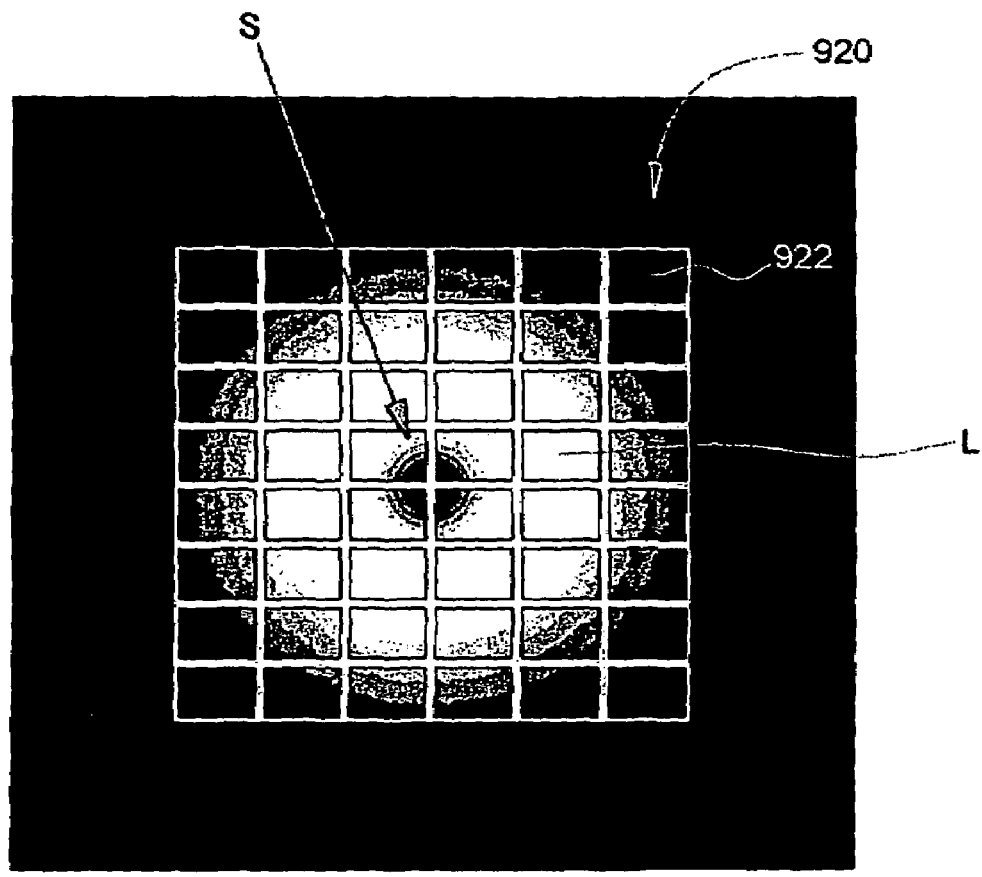
FIG. 15 is a schematic showing the light intensity distribution on the light incident surface of the first lens array in the related art illumination unit.

A polarized-light converting element 140 is configured as shown in FIG. 2 as follows. One set of polarization separating prisms has a polarization separating surface to transmit the illumination luminous flux in accordance with one polarized light component as it is out of the two polarized light components contained in the illumination luminous flux, and reflecting the illumination luminous flux in accordance with the other polarized light component in the direction perpendicular to the system optical axis OC, and a reflecting surface to reflect the other polarized light component in the direction parallel to the system optical axis OC. The respective one sets of the polarization separating prisms are arrayed in four rows, correspondingly to the plurality of the small lenses 122 of the first lens array 120. This enables easier and lower-cost manufacture than with the polarized-light converting element in which polarization separating prisms are arrayed in six rows as in the related art (see, FIG. 13).

On the light emitting surface of the polarized-light converting element 140, phase plates (not shown) are disposed at the positions corresponding to the polarization separating surfaces of the respective polarization separating prisms. This can convert the illumination luminous flux emitted from the polarized-light converting element 140 into the illumination luminous flux in accordance with the other polarized light component. For this reason, the polarized-light converting element 140 may be used for a projector using a liquid crystal device using a polarized light.

The superimposing lens 150 is composed of a condensing lens, and disposed on the illuminated area side of the polarized-light converting element 140. Thus, it is configured such that the illumination luminous fluxes emitted from the polarized-light converting element 140 are condensed, and superimposed on the image formation areas of the liquid crystal devices 400R, 400G, and 400B with the second lens array 130.

With the foregoing illumination unit 100 in accordance with exemplary Embodiment 1, the light incident surface of the first lens array 120 is placed at such a position that the light quantity of the illumination luminous flux from the collimating lens 116 is distributed throughout over the light incident surface. This can make more uniform the inplane light intensity distribution in the light incident surface of the first lens array 120. As a result, when the illumination unit 100 in accordance with exemplary Embodiment 1 is used for a projector, it is possible to suppress the reduction of the inplane light intensity distribution characteristics on the image formation area of the liquid crystal device.

Whereas, with the illumination unit 100 in accordance with exemplary Embodiment 1, it is possible to make more uniform the inplane light intensity distribution on the light incident surface of the first lens array 120. This can reduce the number of the small lenses 120 in the first lens array 120, thereby to make the lens density relatively low. This enables the simplification of manufacturing processing and the reduction of the cost of the first lens array.

As a result, the illumination unit 100 in accordance with exemplary Embodiment 1 can achieve the simplification of manufacturing processing and the reduction of the manufacturing cost of the first lens array without reducing the inplane light intensity distribution characteristics on the image formation area of the liquid crystal device.

Further, a projector 1 in accordance with exemplary Embodiment 1 has the illumination unit 100, the liquid crystal devices 400R, 400G, and 400B to modulate the illumination luminous flux from the illumination unit 100 in response to image information, and the projection optical system 600 to project the modulated lights from the liquid crystal devices 400R, 400G, and 400B.

Thus, the projector 1 in accordance with exemplary Embodiment 1 has the excellent illumination unit 100 capable of achieving the simplification of manufacturing processing and the reduction of the cost of the first lens array without reducing the inplane light intensity distribution characteristics on the image formation area of the liquid crystal devices 400R, 400G, and 400B.

Exemplary Embodiment 2

Figure 6:
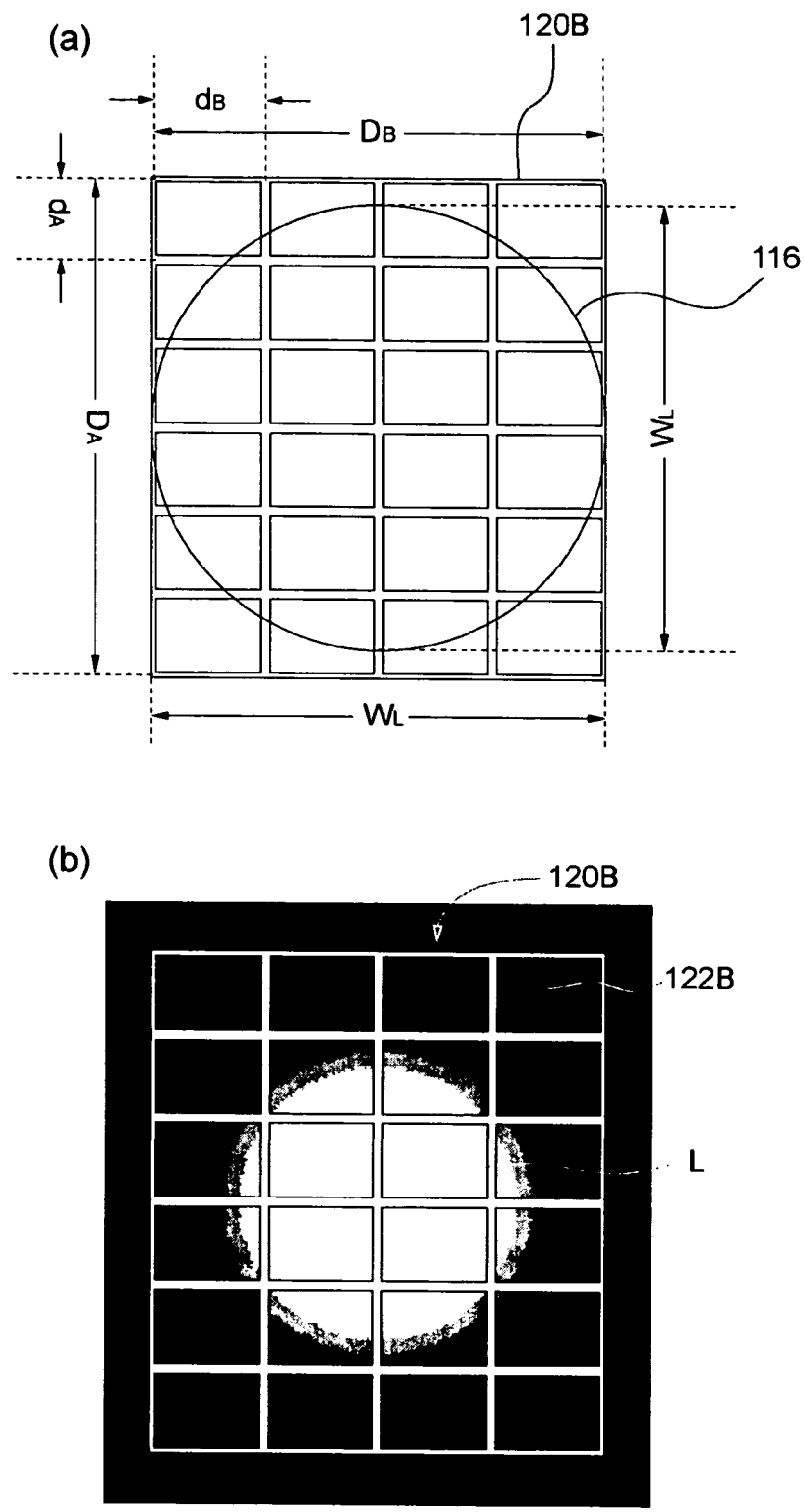
FIGS. 6(a) and 6(b) are schematics to illustrate a first lens array in exemplary Embodiment 2.

FIGS. 6(a) and 6(b) are schematics to illustrate a first lens array in exemplary Embodiment 2. FIG. 6(a) is a schematic showing the first lens array as seen from the front along the system optical axis. FIG. 6(b) is a schematic showing the light intensity distribution on the light incident surface of the first lens array.

An illumination unit (not shown) in accordance with exemplary Embodiment 2 is different in the relationship between the effective diameter of the collimating lens and the maximum longitudinal dimension or the maximum transverse dimension of the first lens array from the case of the illumination unit 100 in accordance with exemplary Embodiment 1. Specifically, in the illumination unit 100 in accordance with exemplary Embodiment 1, the effective diameter $W_L$ of the collimating lens 116 is set at roughly the same dimension as the maximum longitudinal dimension $D_A$ of the first lens array 120 as shown in FIG. 3(a). In contrast, in the illumination unit in accordance with exemplary Embodiment 2, the effective diameter $W_L$ of the collimating lens 116 is set at roughly the same dimension as the maximum transverse dimension $D_B$ of the first lens array 120B as shown in FIG. 6(a).

Thus, in the illumination unit in accordance with exemplary Embodiment 2, the relationship between the effective diameter of the collimating lens and the maximum longitudinal dimension or the maximum transverse dimension of the first lens array is different from that of the illumination unit 100 in accordance with exemplary Embodiment 1. However, in other respects, it has the same configuration as with the illumination unit 100 in accordance with exemplary Embodiment 1. Therefore, it has the corresponding effects possessed by the illumination unit 100 in accordance with exemplary Embodiment 1.

Whereas, in the illumination unit in accordance with exemplary Embodiment 2, as described above, the effective diameter $W_L$ of the collimating lens 116 is set at roughly the same dimension as the maximum transverse dimension $D_B$ of the first lens array 120B. As a result, as shown in FIG. 6(b), almost the total light quantity of the illumination luminous flux emitted from the collimating lens 116 can be received at the light incident surface of the first lens array 120B. This can enhance the light use efficiency in the first lens array.

Exemplary Embodiment 3

FIGS. 7(a)–7(b) are schematics to illustrate the first lens array in exemplary Embodiment 3. FIG. 7(a) is a schematic showing the first lens array as seen from the front along the system optical axis. FIG. 7(b) is a schematic showing the light intensity distribution on the light incident surface of the first lens array.

An illumination unit (not shown) in accordance with exemplary Embodiment 3 is different in the longitudinal to transverse dimension ratio of the small lens in the first lens array, and the relationship between the effective diameter of the collimating lens and the maximum longitudinal dimension or the maximum transverse dimension of the first lens array from the case of the illumination unit 100 in accordance with exemplary Embodiment 1. Specifically, in the illumination unit 100 in accordance with exemplary Embodiment 1, the longitudinal to transverse dimension ratio of the small lens 122 in the first lens array 120 is set at a ratio of longitudinal dimension ($d_A$):transverse dimension ($d_B$)=3:4. In contrast, in the illumination unit in accordance with exemplary Embodiment 3, the longitudinal to transverse dimension ratio of each small lens 122C in a first lens array 120C is set at a ratio of longitudinal dimension ($d_A$):transverse dimension ($d_B$)=2:3. Whereas, in the illumination unit 100 in accordance with exemplary Embodiment 1, the effective diameter $W_L$ of the collimating lens 116 is set at roughly the same dimension as the maximum longitudinal dimension $D_A$ of the first lens array 120 as shown in FIG. 3(a). In contrast, in the illumination unit in accordance with exemplary Embodiment 3, the effective diameter $W_L$ of the collimating lens 116 is set at roughly the same dimension as the maximum longitudinal dimension $D_A$ and the maximum transverse dimension $D_B$ of the first lens array 120C as shown in FIG. 7(a).

Thus, in the illumination unit in accordance with exemplary Embodiment 3, the longitudinal to transverse dimension ratio of the small lens in the first lens array, and the relationship between the effective diameter of the collimating lens and the maximum longitudinal dimension or the maximum transverse dimension of the first lens array are different from those of the illumination unit 100 in accordance with exemplary Embodiment 1. However, in other respects, it has the same configuration as with the illumination unit 100 in accordance with exemplary Embodiment 1. Therefore, it has the corresponding effects possessed by the illumination unit 100 in accordance with exemplary Embodiment 1.

Whereas, in the illumination unit in accordance with exemplary Embodiment 3, as described above, the longitudinal to transverse dimension ratio of the small lens 122C in the first lens array 120C is set at a ratio of longitudinal dimension ($d_A$):transverse dimension ($d_B$)=2:3. In addition, the effective diameter $W_L$ of the collimating lens 116 is set at roughly the same dimension as the maximum longitudinal dimension $D_A$ and the maximum transverse dimension $D_B$ of the first lens array 120B.

Figure 7:
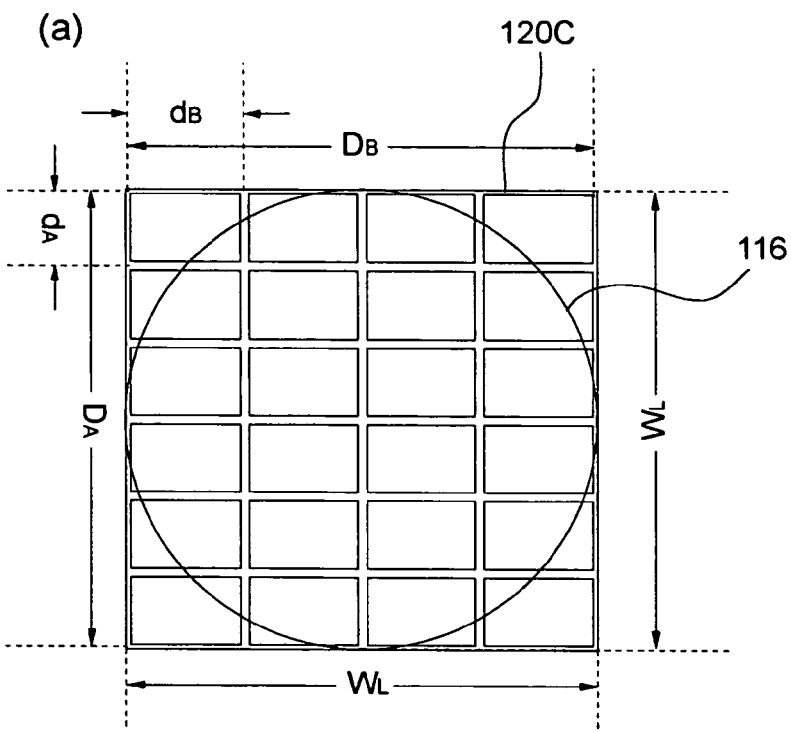
FIGS. 7(a) and 7(b) are schematics to illustrate a first lens array in exemplary Embodiment 3.
Figure 7:
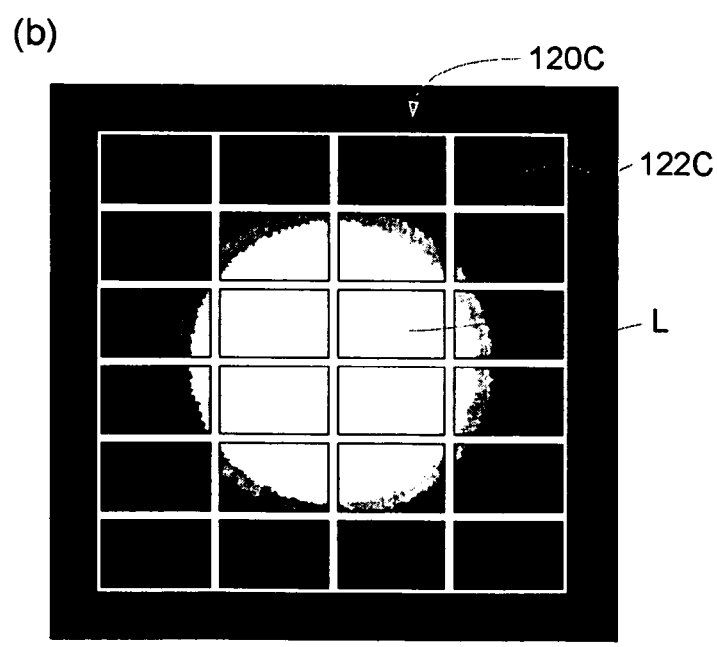

As a result, it is possible to make the shape of the first lens array 120 square. Whereas, the effective diameter $W_L$ of the collimating lens 116 is set at roughly the same dimension as the maximum longitudinal dimension $D_A$ and the maximum transverse dimension $D_B$ of the first lens array 120C. Therefore, as shown in FIG. 7, the illumination luminous flux from the collimating lens 116 can be made to be the inscribed circle of the first lens array 120C. For this reason, it is possible to suppress the reduction of the inplane light intensity distribution characteristics on the light incident surface of the first lens array 120C. This can achieve the enhancement of the light use efficiency in the first lens array 120C.

The illumination unit in accordance with exemplary Embodiment 3 may include an optical element such as a cylindrical lens to correct the longitudinal to transverse dimension ratio of the illumination luminous flux from the first lens array 120 C in order to set the longitudinal to transverse dimension ratio of the cross section of the illumination luminous flux in the illuminated area at a ratio of longitudinal dimension ($d_A$):transverse dimension ($d_B$)=3:4. As a result, the longitudinal to transverse dimension ratio of the illumination luminous flux emitted from the first lens array 120C is corrected by the function of such an optical element so as to be a ratio of longitudinal dimension: transverse dimension=3:4 on the image formation area of the liquid crystal device which is the illuminated area. Accordingly, it is possible to achieve the enhancement of the light use efficiency and the reduction of the stray light level.

Exemplary Embodiment 4

Figure 8:
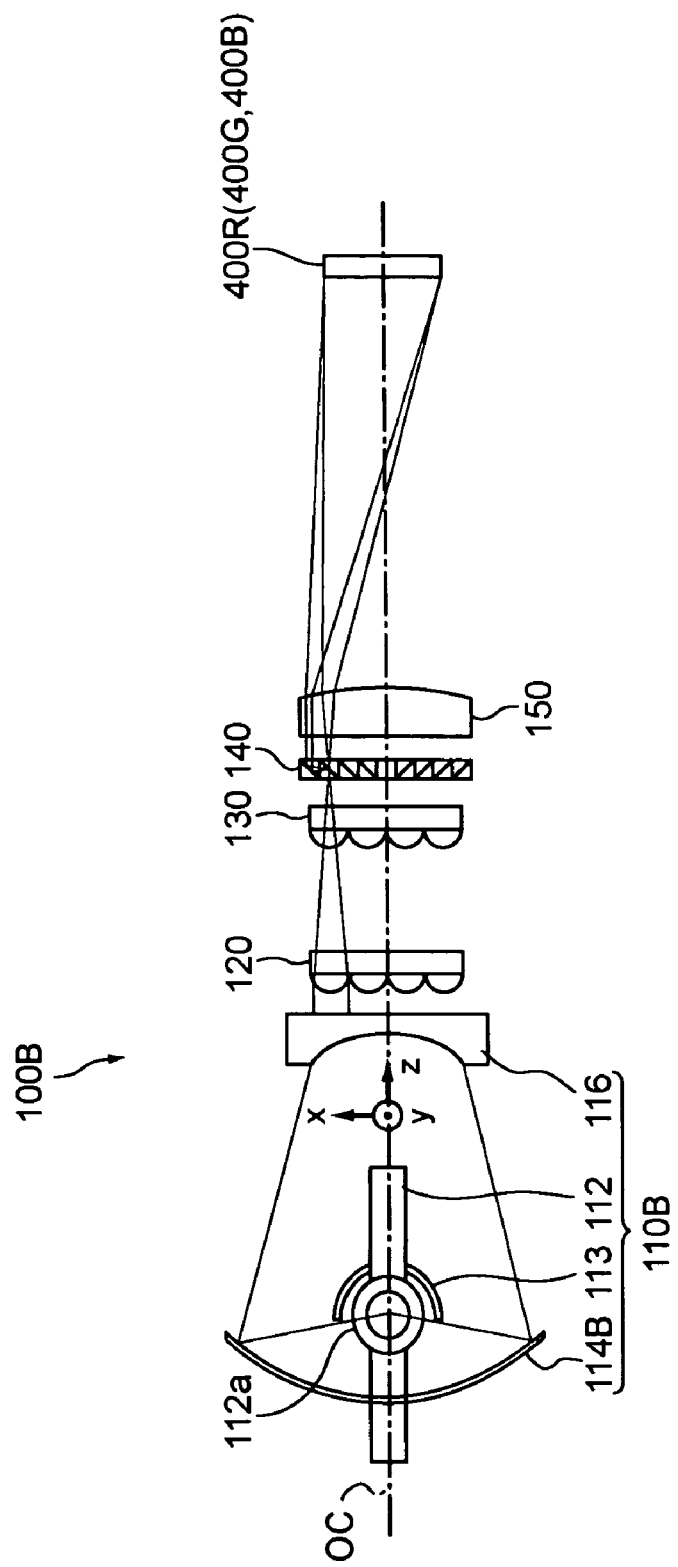
FIG. 8 is a schematic to illustrate an illumination unit in accordance with exemplary Embodiment 4.

FIG. 8 is a schematic to illustrate an illumination unit in accordance with exemplary Embodiment 4. In FIG. 8, the same elements as those in FIG. 2 are given the same reference numerals and characters, and a detailed description thereon will be omitted.

An illumination unit 100B in accordance with exemplary Embodiment 4 is different in the configuration of the light source unit from the case of the illumination unit 100 in accordance with exemplary Embodiment 1. Specifically, in the illumination unit 100B in accordance with exemplary Embodiment 4, the light source unit 100B further includes, as shown in FIG. 8, an auxiliary mirror 113 as a reflecting device to reflect the light emitted toward the illuminated area from the arc tube 112 toward the ellipsoidal reflector 114B. Further, due to the provision of the auxiliary mirror 113, the shape of the ellipsoidal reflector is also different from that of the ellipsoidal reflector 114 in exemplary Embodiment 1.

The auxiliary mirrors 113 are each composed of a reflecting concave member, and placed on the illuminated area side of the light emitting portion 112a. Specifically, they are placed at the opposing sites with a gap for alignment therebetween on the roughly half tube surface situated closer to the +z direction (closer to the direction of travel of the light emitted from the light source unit 110B) than the "plane parallel to the x-y plane, and including the light emitting portion 112a". The auxiliary mirror 113 can be formed, for example, by evaporating a dielectric multilayer film of $Ta_2O_5$ and $SiO_2$ on the concave surface of the concave member.

Thus, the illumination unit 100B in accordance with exemplary Embodiment 4 is different in the configuration of the light source unit from the illumination unit 100 in accordance with exemplary Embodiment 1. However, in other respects, it has the same configuration as with the illumination unit 100 in accordance with exemplary Embodiment 1. Therefore, it has the corresponding effects possessed by the illumination unit 100 in accordance with exemplary Embodiment 1.

Whereas, in the illumination unit 100B in accordance with exemplary Embodiment 4, the arc tube 112 is provided with the auxiliary mirror 113 which is placed on the illuminated area side of the arc tube 112, and reflects the light radiated toward the illuminated area from the light emitting portion 112a to the ellipsoidal reflector 114B. Therefore, the light radiated toward the illuminated area from the arc tube 112 is reflected by the ellipsoidal reflector 114B. This eliminates the necessity of setting the size of the ellipsoidal reflector at such a size as to cover even the edge of the arc tube 112 on the illuminated area side, which enables the reduction in size of the ellipsoidal reflector. As a result, it is possible to achieve the reduction in size of the illumination unit.

Further, since the reduction in size of the ellipsoidal reflector can be achieved, it is possible to reduce the convergent angle of the beams converging from the ellipsoidal reflector 114B toward the second focus $F_2$ of the ellipsoidal reflector 114B, and the diameter of the beam spot. Accordingly, it is possible to further reduce each size of the respective optical elements of the subsequent stages including the collimating lens 116, which enables the further reduction in size of the illumination unit.

In the illumination unit 100B in accordance with exemplary Embodiment 4, a reflecting film directly formed on the tube surface of the arc tube 112 by evaporation or the like may also be used in place of the auxiliary mirror 113 as a reflection device.

Exemplary Embodiment 5

Figure 9:
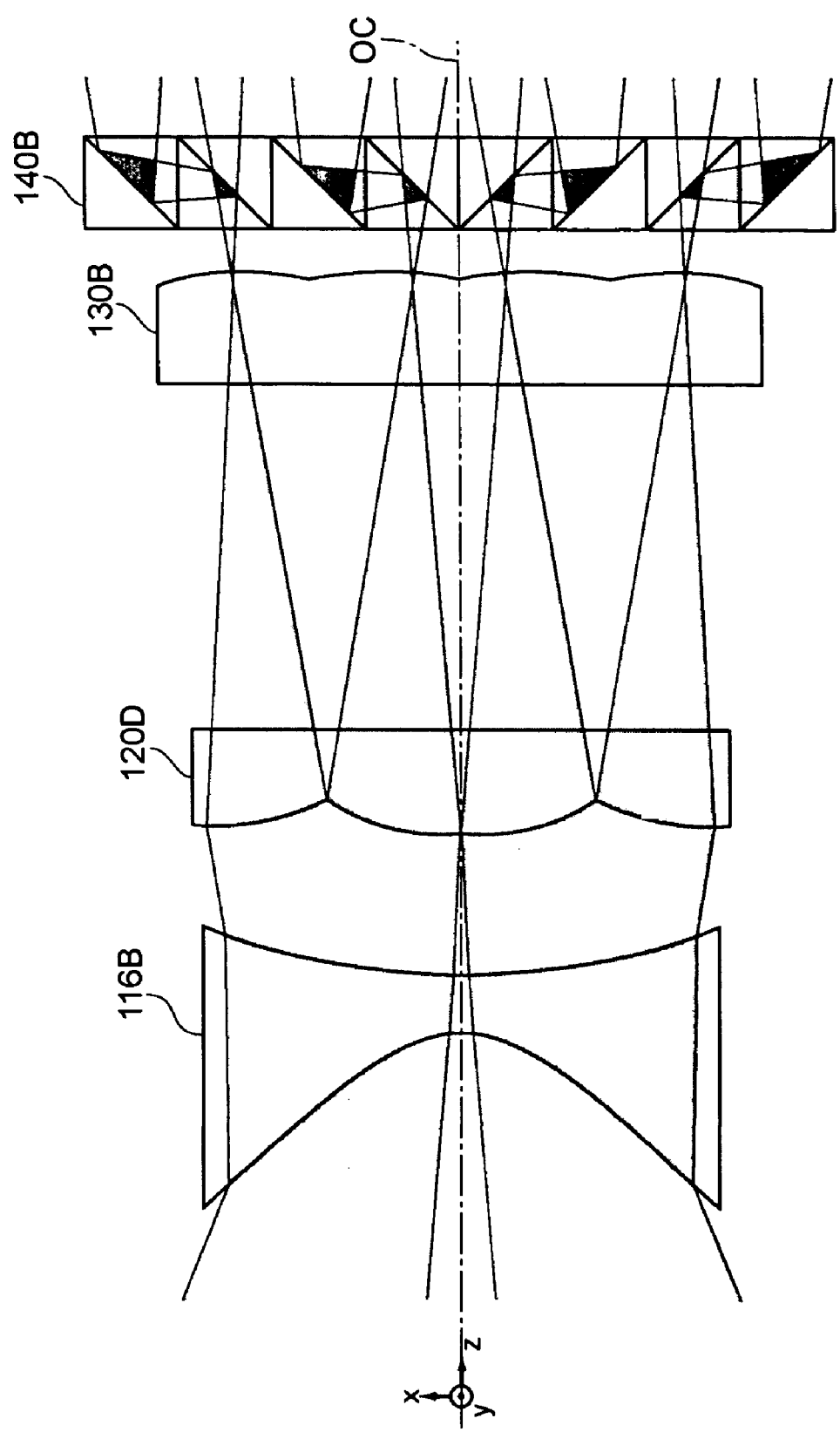
FIG. 9 is a schematic to illustrate an illumination unit in accordance with exemplary Embodiment 5.

FIG. 9 is a schematic shown for illustrating an illumination unit in accordance with exemplary Embodiment 5.

The illumination unit in accordance with exemplary Embodiment 5 is different in the configurations of the first lens array and the second lens array from the case of the illumination unit 100B in accordance with exemplary Embodiment 4 as shown in FIG. 9. Further, due to the fact that it is different in the configurations of the first lens array and the second lens array, it is also different in the configurations of the collimating lens and the polarized-light converting element.

Specifically, in the illumination unit in accordance with exemplary Embodiment 5, the maximum longitudinal dimension and the maximum transverse dimension in the second lens array 130B are set larger than the maximum longitudinal dimension and the maximum transverse dimension in the first lens array 120D, respectively. This can increase the size of each small lens in the second lens array 130B to a certain degree. For this reason, it becomes easy to put the arc image formed by each small lens in the first lens array 120D within each small lens in the second lens array 130B. This facilitates the achievement of the enhancement of the light use efficiency.

Thus, the illumination unit in accordance with exemplary Embodiment 5 is different in the configurations of the first lens array and the second lens array from the case of the illumination unit 100B in accordance with exemplary Embodiment 4. However, as with the illumination unit 100B in accordance with exemplary Embodiment 4, the light incident surface of the first lens array 120D is placed at such a position that the light quantity of the illumination luminous flux from the collimating lens 116 is distributed throughout over the light incident surface. This can make more uniform the inplane light intensity distribution on the light incident surface of the first lens array 120D. As a result, when the illumination unit in accordance with exemplary Embodiment 5 is used for a projector, it is possible to suppress the reduction of the inplane light intensity distribution characteristics on the image formation area of the liquid crystal device.

Whereas, with the illumination unit in accordance with exemplary Embodiment 5, it is possible to make more uniform the inplane light intensity distribution on the light incident surface of the first lens array 120D. This can reduce the number of the small lenses in the first lens array 120D, thereby to make the lens density relatively low. This enables the simplification of manufacturing processing and the reduction of the cost of the first lens array.

As a result, the illumination unit in accordance with exemplary Embodiment 5 becomes an illumination unit capable of achieving the simplification of manufacturing processing and the reduction of the manufacturing cost of the first lens array without reducing the inplane light intensity distribution characteristics on the image formation area of the liquid crystal device.

Exemplary Embodiment 6

Figure 10:
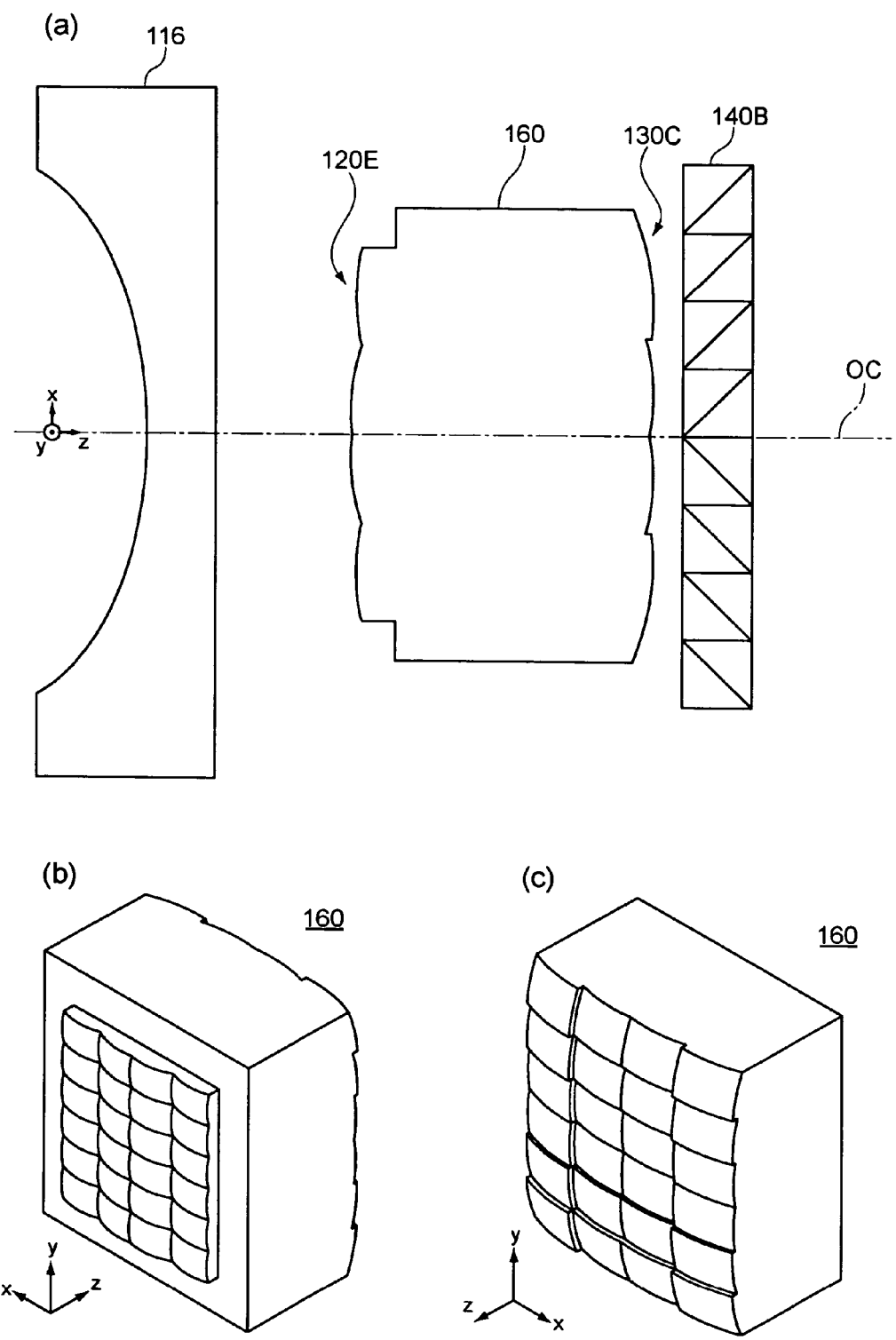
FIGS. 10(a)–10(c) are schematics to illustrate an illumination unit in accordance with exemplary Embodiment 6.

FIGS. 10(a)–10(c) are schematics shown for illustrating an illumination unit in accordance with exemplary Embodiment 6. FIG. 10(a) is a schematic showing an essential part of the illumination unit in accordance with exemplary Embodiment 6 as seen from above. FIG. 10(b) is a schematic of a lens array unit having a first lens array and a second lens array as seen from the first lens array side. FIG. 10(c) is a schematic of the lens array unit as seen from the second lens array side.

The illumination unit in accordance with exemplary Embodiment 6 is different in the configurations of the first lens array and the second lens array as shown in FIG. 10(a) from the case of the illumination unit 100B in accordance with exemplary Embodiment 4. Whereas, due to the fact that it differs in the configurations of the first lens array and the second lens array, it also differs in the configuration of the polarized-light converting element.

Specifically, in the illumination unit in accordance with exemplary Embodiment 6, as shown in FIGS. 10(a)–10(c), the first lens array 120E and the second lens array 130C are integrally formed. Whereas, the lens array unit 160 having the first lens array 120E and the second lens array 130C is disposed between the collimating lens 116 and the polarized-light converting element 140B.

For this reason, with the illumination unit in accordance with exemplary Embodiment 6, the illumination luminous flux emitted from the first lens array 120E is made incident upon the second lens array 130C without passing through the air layer. This results in no occurrence of the reflection of light, or the like, at the light emitting surface of the first lens array or the light incident surface of the second lens array. Therefore, it becomes possible to suppress the loss of the light quantity due to such undesirable reflection or the like. Further, it becomes unnecessary to carry out the alignment between the first lens array and the second lens array for assembly of the illumination unit. In addition, after the assembly of the illumination unit, it becomes possible to suppress the deterioration of the positional precision of the first lens array and the second lens array.

Thus, the illumination unit in accordance with exemplary Embodiment 6 is different in the configurations of the first lens array and the second lens array from the case of the illumination unit 100B in accordance with exemplary Embodiment 4. However, as with the illumination unit 100B in accordance with exemplary Embodiment 4, the light incident surface of the first lens array 120E is placed at such a position that the light quantity of the illumination luminous flux from the collimating lens 116 is distributed throughout over the light incident surface. This can make more uniform the inplane light intensity distribution on the light incident surface of the first lens array 120E. As a result, when the illumination unit in accordance with exemplary Embodiment 6 is used for a projector, it is possible to suppress the reduction of the inplane light intensity distribution characteristics on the image formation area of the liquid crystal device.

Whereas, with the illumination unit in accordance with exemplary Embodiment 6, it is possible to make more uniform the inplane light intensity distribution on the light incident surface of the first lens array 120E. This can reduce the number of the small lenses in the first lens array 120E, thereby to make the lens density relatively low. This enables the simplification of manufacturing processing and the reduction of the cost of the first lens array.

As a result, the illumination unit in accordance with exemplary Embodiment 6 becomes an illumination unit capable of achieving the simplification of manufacturing processing and the reduction of the manufacturing cost of the first lens array without reducing the inplane light intensity distribution characteristics on the image formation area of the liquid crystal device.

Exemplary Embodiment 7

FIGS. 11(a)–11(c) are schematics shown for illustrating an illumination unit in accordance with exemplary Embodiment 7. FIG. 11(a) is a schematic showing an essential part of the illumination unit in accordance with exemplary Embodiment 7 as seen from above. FIG. 11(b) is a schematic of a lens array unit having a first lens array and a second lens array as seen from the first lens array side. FIG. 11(c) is a schematic of the lens array unit as seen from the second lens array side.

The illumination unit in accordance with exemplary Embodiment 7 is different in the configurations of the first lens array and the second lens array as shown in FIG. 11(a) from the case of the illumination unit 100B in accordance with exemplary Embodiment 4. Whereas, due to the fact that it differs in the configurations of the first lens array and the second lens array, it also differs in the configuration of the polarized-light converting element.

Figure 11:
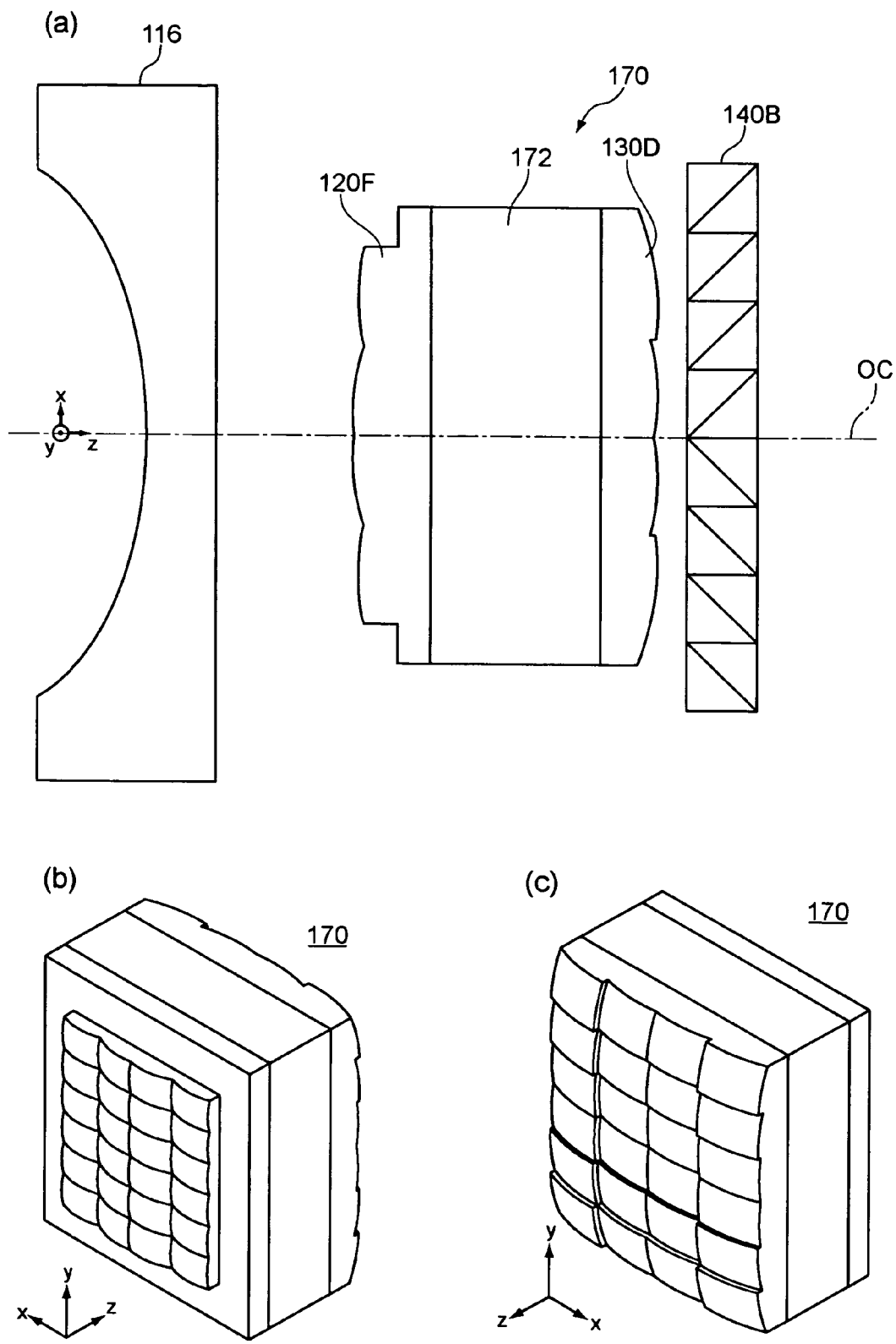
FIGS. 11(a)–11(c) are schematics to illustrate an illumination unit in accordance with exemplary Embodiment 7.

Specifically, the illumination unit in accordance with exemplary Embodiment 7 further has, as shown in FIG. 11, a light transmitting portion 172 to guide the light from the first lens array 120F to the second lens array 130D between the first lens array 120F and the second lens array 130D. The first lens array 120F and the second lens array 130D are bonded through the light transmitting portion 172. Whereas, the lens array unit 170 having the first lens array 120E, the second lens array 130C, and the light transmitting portion 172 is disposed between the collimating lens 116 and the polarized-light converting element 140B.

For this reason, with the illumination unit in accordance with exemplary Embodiment 7, the illumination luminous flux emitted from the first lens array 120F is made incident upon the second lens array 130D without passing through the air layer. This enables the suppression of the reflection of light, or the like, at the light emitting surface of the first lens array or the light incident surface of the second lens array. For this reason, it becomes possible to reduce the loss of the light quantity due to such undesirable reflection or the like. Further, for the assembly of the illumination unit, the first lens array 120F and the second lens array 130D are aligned in advance, and then, bonded to the light transmitting portion 172. This results in that only the alignment between the lens array unit 170 having the first lens array 120F and the second lens array 130D and other optical components is required. For this reason, it becomes possible to carry out the alignment between the respective optical components in the illumination unit with ease.

In addition, with the illumination unit in accordance with exemplary Embodiment 7, different from the case where the first lens array 120E and the second lens array 130C are integrally formed as with the lens array unit 160 in exemplary Embodiment 6, the lens array unit 170 having the first lens array 120F and the second lens array 130D can be manufactured in the following manner. The respective ones are individually formed as separate members and then, these are bonded to each other by an adhesive or the like. This also produces an effect of easier manufacturing as compared with the case where the first lens array and the second lens array are integrally formed as with the illumination unit in accordance with exemplary Embodiment 6.

In the illumination unit in accordance with exemplary Embodiment 7, the light transmitting portion 172 is composed of the same base material as that for the first lens array 120F and the second lens array 130D. As for the adhesive for bonding between the first lens array 120F and the light transmitting portion 172, and between the light transmitting portion 172 and the second lens array 130D, the one having almost the same refractive index as that of the first lens array 120F, the second lens array 130D, and the light transmitting portion 172 is used. As a result, the first lens array 120F and the second lens array 130D, and the light transmitting portion 172 have the equal refractive index. Accordingly, it becomes possible to further suppress the reflection of the light or the like at the interface between each of the first lens array 120F and the second lens array 130D and the light transmitting portion 172. This enables the further reduction of the loss of the light quantity due to such undesirable reflection or the like. Whereas, the first lens array 120F and the second lens array 130D, and the light transmitting portion 172 have an equal coefficient of linear expansion. This enables the suppression of generation of thermal stress with the temperature change due to use of the projector. Accordingly, it becomes possible to suppress the damages at the bonding portions between the first lens array and the second lens array, and the light transmitting portion.

In the illumination unit in accordance with exemplary Embodiment 7, as the base material for the first lens array 120F, the second lens array 130D, and the light transmitting portion 172, glass with a glass transition point of 550 degrees or less is used.

Thus, the illumination unit in accordance with exemplary Embodiment 7 is different in the configurations of the first lens array and the second lens array from the case of the illumination unit 100B in accordance with exemplary Embodiment 4. However, as with the illumination unit 100B in accordance with exemplary Embodiment 4, the light incident surface of the first lens array 120F is placed at such a position that the light quantity of the illumination luminous flux from the collimating lens 116 is distributed throughout over the light incident surface. This can make more uniform the inplane light intensity distribution on the light incident surface of the first lens array 120F. As a result, when the illumination unit in accordance with exemplary Embodiment 7 is used for a projector, it is possible to suppress the reduction of the inplane light intensity distribution characteristics on the image formation area of the liquid crystal device.

Whereas, with the illumination unit in accordance with exemplary Embodiment 7, it is possible to make more uniform the inplane light intensity distribution on the light incident surface of the first lens array 120F. This can reduce the number of the small lenses in the first lens array 120F, thereby to make the lens density relatively low. This enables the simplification of manufacturing processing and the reduction of the cost of the first lens array.

As a result, the illumination unit in accordance with exemplary Embodiment 7 becomes an illumination unit capable of achieving the simplification of manufacturing processing and the reduction of the manufacturing cost of the first lens array without reducing the inplane light intensity distribution characteristics on the image formation area of the liquid crystal device Exemplary Embodiment 8

Figure 12:
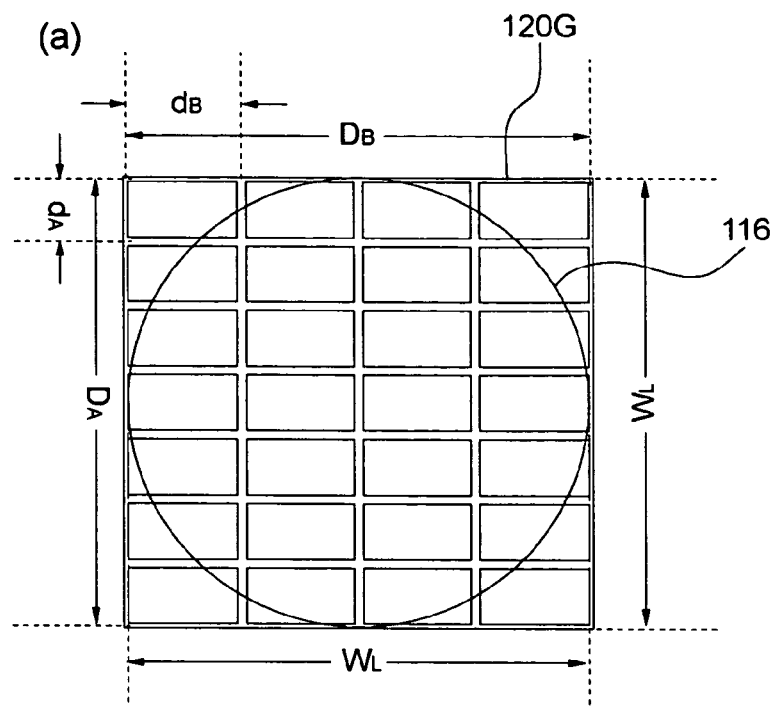
FIGS. 12(a)–12(b) are schematics to illustrate a first lens array in exemplary Embodiment 8.
Figure 12:
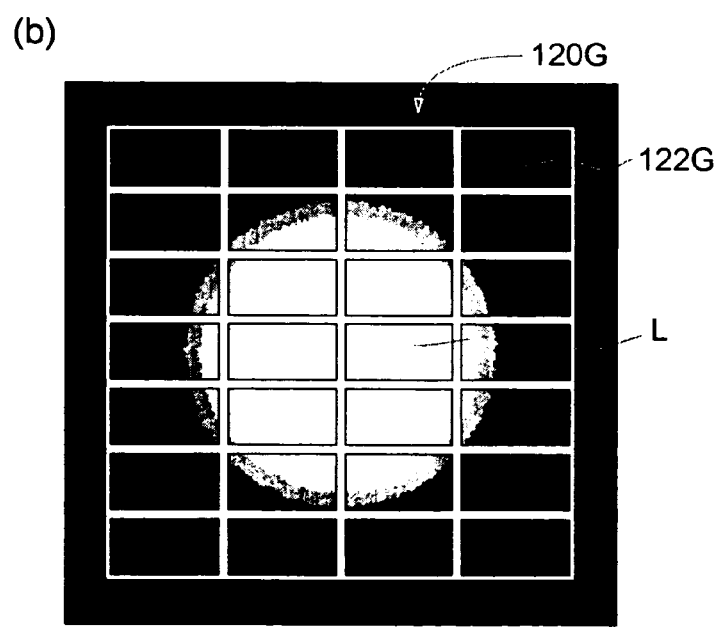

FIGS. 12(*a*)–12(*b*) are schematics shown for illustrating a first lens array in exemplary Embodiment 8. FIG. 12(*a*) is a schematic showing the first lens array as seen from the front along the system optical axis. FIG. 12(*b*) is a schematic showing the light intensity distribution on the light incident surface of the first lens array.

A projector (not shown) in accordance with exemplary Embodiment 8 is different in the configuration of the liquid crystal device from the case of the projector (not shown) in accordance with exemplary Embodiment 4. Specifically, in the projector in accordance with exemplary Embodiment 4, the liquid crystal devices 400R, 400G, and 400B are used, each of which have the longitudinal to transverse dimension ratio of the image formation area set at a ratio of longitudinal dimension:transverse dimension=3:4. In the projector in accordance with exemplary Embodiment 8, a liquid crystal device (not shown) for wide vision is used of which the longitudinal to transverse dimension ratio of the image formation area is set at a ratio of longitudinal dimension: transverse dimension=9:16.

Further, due to the fact that the illumination unit (not shown) in accordance with exemplary Embodiment 8 is different in the configuration of the liquid crystal devices as described above, it is different in the configuration of the first lens array from the case of the illumination unit 100B in accordance with exemplary Embodiment 4. Specifically, in the illumination unit in accordance with exemplary Embodiment 8, a plurality of small lenses 122G of the first lens array 120G are, as shown in FIG. 12(*a*), arrayed in a matrix with seven rows by four columns in the transverse direction and in the longitudinal direction, respectively, and disposed at the positions corresponding to the respective rows/respective columns of the matrix. This can set the number of the small lenses 122G in the first lens array 120G at 28, which enables the reduction of the number of the lenses. This enables the simplification of manufacturing processing and the reduction of the cost of the first lens array.

In the illumination unit in accordance with exemplary Embodiment 8, the longitudinal to transverse dimension ratio of a plurality of the small lenses 122G of the first lens array 120G is set at a ratio of longitudinal dimension $(d_A)$:transverse dimension $(d_B)$=9:16. As a result, to illuminate a liquid crystal device for wide vision in which the longitudinal to transverse dimension ratio of the image formation area is set at a ratio of longitudinal dimension: transverse dimension=9:16, it is possible to achieve the enhancement of the light use efficiency and the reduction of the stray light level in the projector.

In the illumination unit in accordance with exemplary Embodiment 8, a plurality of the small lenses 122G of the first lens array 120G may also be configured to be disposed at the matrix positions except for the positions corresponding to the first row/first column, the first row/fourth column, the seventh row/first column, and the seventh row/fourth column of the matrix with seven rows/four columns. This can set the number of the small lenses 122G in the first lens array 120G at 24, which further enables the reduction of the number of the lenses.

What is claimed is:

1. An illumination unit, comprising:
   an ellipsoidal reflector having a first focus and a second focus;
   an arc tube having a light emitting portion in the vicinity of the first focus;
   a collimating lens to convert a light from the ellipsoidal reflector into a roughly parallel illumination luminous flux, a light incident surface of the collimating lens being situated at a position which is such that an area with an extremely small incident light intensity is present at a central part of the light incident surface of the collimating lens; and
   a first lens array having a plurality of small lenses to split the illumination luminous flux from the collimating lens into a plurality of partial luminous fluxes, the partial luminous fluxes from the first lens array being superimposed at the illuminated area respectively, a light incident surface of the first lens array being situated at a position which is closer to the ellipsoidal reflector than the second focus, and which is such that an area with an extremely small incident light intensity is not present at a central part of the light incident surface of the first lens array.
2. The illumination unit according to claim 1,
   the plurality of the small lenses of the first lens array being arrayed in a matrix with six rows by four columns in a transverse direction and in the longitudinal direction, respectively, and disposed at the positions corresponding to the respective rows and respective columns of the matrix.

3. The illumination unit according to claim 1,
the plurality of the small lenses of the first lens array being arrayed in a matrix with six rows by four columns in a transverse direction and in a longitudinal direction, respectively, and disposed at the matrix positions except for positions corresponding to the first row/first column, the first row/fourth column, the sixth row/first column, and the sixth row/fourth column of the matrix.

4. The illumination unit according to claim 2,
a longitudinal to transverse dimension ratio of the plurality of the small lenses in the first lens array being set at a ratio of longitudinal dimension:transverse dimension=3:4.

5. The illumination unit according to claim 4,
an effective diameter of the collimating lens being set at roughly the same dimension as the maximum longitudinal dimension of the first lens array.

6. The illumination unit according to claim 4,
the effective diameter of the collimating lens being set at roughly the same dimension as the maximum transverse dimension of the first lens array.

7. The illumination unit according to claim 2,
a longitudinal to transverse dimension ratio of the plurality of the small lenses in the first lens array being set at a ratio of longitudinal dimension:transverse dimension=2:3.

8. The illumination unit according to claim 7,
an effective diameter of the collimating lens being set at roughly a same dimension as a maximum longitudinal dimension and a maximum transverse dimension of the first lens array.

9. The illumination unit according to claim 7, further comprising:
an optical element to correct a longitudinal to transverse dimension ratio of the illumination luminous flux from the first lens array in order to set a longitudinal to transverse dimension ratio of the cross section of the illumination luminous flux in the illuminated area at a ratio of longitudinal dimension:transverse dimension=3:4.

10. The illumination unit according to claim 1,
the plurality of the small lenses of the first lens array being arrayed in a matrix with seven rows by four columns in a transverse direction and in a longitudinal direction, respectively, and disposed at positions corresponding to the respective rows/respective columns of the matrix.

11. The illumination unit according to claim 1,
the plurality of the small lenses of the first lens array being arrayed in a matrix with seven rows by four columns in a transverse direction and in a longitudinal direction, respectively, and disposed at the matrix positions except for positions corresponding to the first row/first column, the first row/fourth column, the seventh row/first column, and the seventh row/fourth column of the matrix.

12. The illumination unit according to claim 10,
a longitudinal to transverse dimension ratio of the plurality of the small lenses in the first lens array being set at a ratio of longitudinal dimension:transverse dimension=9:16.

13. The illumination unit according to claim 1, further comprising:
a second lens array having a plurality of small lenses corresponding to the plurality of the small lenses of the first lens array,
a maximum longitudinal dimension and a maximum transverse dimension in the second lens array being set larger than a maximum longitudinal dimension and a maximum transverse dimension in the first lens array, respectively.

14. The illumination unit according to claim 1, further comprising:
a second lens array having a plurality of small lenses corresponding to the plurality of the small lenses of the first lens array,
the first lens array and the second lens array being integrally formed.

15. The illumination unit according to claim 1, further comprising:
a second lens array having a plurality of small lenses corresponding to the plurality of the small lenses of the first lens array,
a light transmitting portion to guide a light from the first lens array to the second lens array between the first lens array and the second lens array,
the first lens array and the second lens array being bonded through the light transmitting portion.

16. The illumination unit according to claim 1, further comprising:
a reflection device which is disposed on an illuminated area side of the arc tube, and reflects a light radiated from the light emitting portion toward the illuminated area to the ellipsoidal reflector.

17. A projector, comprising:
the illumination unit according to claim 1;
an electrooptic modulation unit to modulate an illumination luminous flux from the illumination unit in response to image information; and
a projection optical system to project a modulated light from the electrooptic modulation unit.

18. The projector according to claim 17,
the plurality of the small lenses of the first lens array being arrayed in a matrix with six rows by four columns in a transverse direction and in the longitudinal direction, respectively, and disposed at the positions corresponding to the respective rows and respective columns of the matrix.

19. The projector according to claim 17,
the plurality of the small lenses of the first lens array being arrayed in a matrix with six rows by four columns in a transverse direction and in a longitudinal direction, respectively, and disposed at the matrix positions except for positions corresponding to the first row/first column, the first row/fourth column, the sixth row/first column, and the sixth row/fourth column of the matrix.

20. The projector according to claim 18,
a longitudinal to transverse dimension ratio of the plurality of the small lenses in the first lens array being set at a ratio of longitudinal dimension:transverse dimension=3:4.

21. The projector according to claim 20,
an effective diameter of the collimating lens being set at roughly the same dimension as the maximum longitudinal dimension of the first lens array.

22. The projector according to claim 20,
the effective diameter of the collimating lens being set at roughly the same dimension as the maximum transverse dimension of the first lens array.

23. The projector according to claim 18,
a longitudinal to transverse dimension ratio of the plurality of the small lenses in the first lens array being set at a ratio of longitudinal dimension:transverse dimension=2:3.

24. The projector according to claim 23,
an effective diameter of the collimating lens being set at roughly a same dimension as a maximum longitudinal dimension and a maximum transverse dimension of the first lens array.

25. The projector according to claim 23, further comprising:
an optical element to correct a longitudinal to transverse dimension ratio of the illumination luminous flux from the first lens array in order to set a longitudinal to transverse dimension ratio of the cross section of the illumination luminous flux in the illuminated area at a ratio of longitudinal dimension:transverse dimension=3:4.

26. The projector according to claim 17,
the plurality of the small lenses of the first lens array being arrayed in a matrix with seven rows by four columns in a transverse direction and in a longitudinal direction, respectively, and disposed at positions corresponding to the respective rows/respective columns of the matrix.

27. The projector according to claim 17,
the plurality of the small lenses of the first lens array being arrayed in a matrix with seven rows by four columns in a transverse direction and in a longitudinal direction, respectively, and disposed at the matrix positions except for positions corresponding to the first row/first column, the first row/fourth column, the seventh row/first column, and the seventh row/fourth column of the matrix.

28. The projector according to claim 26,
a longitudinal to transverse dimension ratio of the plurality of the small lenses in the first lens array being set at a ratio of longitudinal dimension:transverse dimension=9:16.

29. The projector according to claim 17, further comprising:
a second lens array having a plurality of small lenses corresponding to the plurality of the small lenses of the first lens array,
a maximum longitudinal dimension and a maximum transverse dimension in the second lens array being set larger than a maximum longitudinal dimension and a maximum transverse dimension in the first lens array, respectively.

30. The projector according to claim 17, further comprising:
a second lens array having a plurality of small lenses corresponding to the plurality of the small lenses of the first lens array,
the first lens array and the second lens array being integrally formed.

31. The projector according to claim 17, further comprising:
a second lens array having a plurality of small lenses corresponding to the plurality of the small lenses of the first lens array, and
a light transmitting portion to guide a light from the first lens array to the second lens array between the first lens array and the second lens array,
the first lens array and the second lens array being bonded through the light transmitting portion.

32. The projector according to claim 17, further comprising:
a reflection device which is disposed on an illuminated area side of the arc tube, and reflects a light radiated from the light emitting portion toward the illuminated area to the ellipsoidal reflector.

* * * * *